US008255207B2

(12) United States Patent
Vaillancourt et al.

(10) Patent No.: US 8,255,207 B2
(45) Date of Patent: Aug. 28, 2012

(54) METHOD AND DEVICE FOR EFFICIENT FRAME ERASURE CONCEALMENT IN SPEECH CODECS

(75) Inventors: Tommy Vaillancourt, Sherbrooke (CA); Milan Jelinek, Sherbrooke (CA); Philippe Gournay, Sherbrooke (CA); Redwan Salami, St-Laurent (CA)

(73) Assignee: Voiceage Corporation, Quebec (CA)

( * ) Notice: Subject to any disclaimer, the term of this patent is extended or adjusted under 35 U.S.C. 154(b) by 941 days.

(21) Appl. No.: 12/095,224

(22) PCT Filed: Dec. 27, 2006

(86) PCT No.: PCT/CA2006/002146

§ 371 (c)(1),
(2), (4) Date: Sep. 22, 2008

(87) PCT Pub. No.: WO2007/073604

PCT Pub. Date: Jul. 5, 2007

(65) Prior Publication Data

US 2011/0125505 A1 May 26, 2011

Related U.S. Application Data

(60) Provisional application No. 60/754,187, filed on Dec. 28, 2005.

(51) Int. Cl.
*G10L 15/00* (2006.01)

(52) U.S. Cl. .... 704/219; 704/223; 704/500; 375/240.27

(58) Field of Classification Search .................. 704/219, 704/223, 500; 375/240.27
See application file for complete search history.

(56) References Cited

U.S. PATENT DOCUMENTS 4,539,684 A * 9/1985 Kloker .......................... 714/789

(Continued)

FOREIGN PATENT DOCUMENTS

EP 0 747 883 7/2001

(Continued)

OTHER PUBLICATIONS

"Coding of Speech at 8 kbit/s Using Conjugate-Structure Algebraic-Code-Excited Linear-Prediction (CS-ACELP)," ITU-T Recommendation G 729, Mar. 1996, 38 pages. "G. 729-based Embedded Variable Bit-Rate Coder: An 8-32 kbit/s Scalable Wideband Coder Bitstream Interoperable with G. 729," ITU-T Recommendation G. 729.1, May 2006, 98 pages.
"Wideband Coding of Speech at Around 16 kbit/s Using Adaptive (Continued)

*Primary Examiner* — Daniel D Abebe
(74) *Attorney, Agent, or Firm* — Fay Kaplun & Marcin, LLP

(57) ABSTRACT

A method and device for concealing frame erasures caused by frames of an encoded sound signal erased during transmission from an encoder to a decoder and for recovery of the decoder after frame erasures comprise, in the encoder, determining concealment/recovery parameters including at least phase information related to frames of the encoded sound signal. The concealment/recovery parameters determined in the encoder are transmitted to the decoder and, in the decoder, frame erasure concealment is conducted in response to the received concealment/recovery parameters. The frame erasure concealment comprises resynchronizing, in response to the received phase information, the erasure-concealed frames with corresponding frames of the sound signal encoded at the encoder. When no concealment/recovery parameters are transmitted to the decoder, a phase information of each frame of the encoded sound signal that has been erased during transmission from the encoder to the decoder is estimated in the decoder. Also, frame erasure concealment is conducted in the decoder in response to the estimated phase information, wherein the frame erasure concealment comprises resynchronizing, in response to the estimated phase information, each erasure-concealed frame with a corresponding frame of the sound signal encoded at the encoder.

72 Claims, 13 Drawing Sheets

U.S. PATENT DOCUMENTS

| | | | | |
|---|---|---|---|---|
| 5,444,816 | A | 8/1995 | Adoul et al. | |
| 5,699,482 | A | 12/1997 | Adoul et al. | |
| 5,701,392 | A | 12/1997 | Adoul et al. | |
| 5,732,389 | A | 3/1998 | Kroon et al. | |
| 5,754,976 | A | 5/1998 | Adoul et al. | |
| 5,828,676 | A * | 10/1998 | Hurlbut et al. | 714/752 |
| 6,680,987 | B1 * | 1/2004 | Beidas et al. | 375/343 |
| 7,460,610 | B2 * | 12/2008 | Matsumoto | 375/285 |
| 2003/0103582 | A1 * | 6/2003 | Linsky et al. | 375/327 |
| 2004/0184522 | A1 * | 9/2004 | Kravtsov | 375/233 |

FOREIGN PATENT DOCUMENTS

| | | |
|---|---|---|
| RU | 2000 10255 | 1/2002 |
| WO | 01 / 86637 | 11/2001 |
| WO | 03/102921 | 12/2003 |

OTHER PUBLICATIONS

Multi-Rate Wideband (AMR-WB)," ITU-T Recommendation G.722.2, Jul. 2003, 72 pages.

"3rd Generation Partnership Project; Technical Specification Group Service and System Aspects; Audio Codec Processing Functions; Extended Adaptive Multi-Rate -Wideband (AMR-WB+) Codec; Transcoding functions (Release 7)," 3gpp ts 26.290, Mar. 2007, 85 pages.

Anderson et al., "Pitch Resynchronization While Recovering from a Late Frame in a Predictive Speech Decoder", Conference on Spoken Language Processing, XP003009933, Sep. 17, 2006, pp. 245-248.

Chibani et al., "Resynchronization of the Adaptive Codebook in a Constrained Celp Codec After a Frame Erasure", ICASSP Conference, May 16, 2006, XP002547395, pp. 1-4.

* cited by examiner

Figure 13
Good frames
UNVOICED
Erased frames
Good frames
VOICED

METHOD AND DEVICE FOR EFFICIENT FRAME ERASURE CONCEALMENT IN SPEECH CODECS

FIELD OF THE INVENTION

The present invention relates to a technique for digitally encoding a sound signal, in particular but not exclusively a speech signal, in view of transmitting and/or synthesizing this sound signal. More specifically, the present invention relates to robust encoding and decoding of sound signals to maintain good performance in case of erased frame(s) due, for example, to channel errors in wireless systems or lost packets in voice over packet network applications.

BACKGROUND OF THE INVENTION

The demand for efficient digital narrow and wideband speech encoding techniques with a good trade-off between the subjective quality and bit rate is increasing in various application areas such as teleconferencing, multimedia, and wireless communications. Until recently, a telephone bandwidth constrained into a range of 200-3400 Hz has mainly been used in speech coding applications. However, wideband speech applications provide increased intelligibility and naturalness in communication compared to the conventional telephone bandwidth. A bandwidth in the range of 50-7000 Hz has been found sufficient for delivering a good quality giving an impression of face-to-face communication. For general audio signals, this bandwidth gives an acceptable subjective quality, but is still lower than the quality of FM radio or CD that operate on ranges of 20-16000 Hz and 20-20000 Hz, respectively.

A speech encoder converts a speech signal into a digital bit stream which is transmitted over a communication channel or stored in a storage medium. The speech signal is digitized, that is, sampled and quantized with usually 16-bits per sample. The speech encoder has the role of representing these digital samples with a smaller number of bits while maintaining a good subjective speech quality. The speech decoder or synthesizer operates on the transmitted or stored bit stream and converts it back to a sound signal.

Code-Excited Linear Prediction (CELP) coding is one of the best available techniques for achieving a good compromise between the subjective quality and bit rate. This encoding technique is a basis of several speech encoding standards both in wireless and wireline applications. In CELP encoding, the sampled speech signal is processed in successive blocks of L samples usually called frames, where L is a predetermined number corresponding typically to 10-30 ms of speech signal. A linear prediction (LP) filter is computed and transmitted every frame. The computation of the LP filter typically needs a lookahead, a 5-15 ms speech segment from the subsequent frame. The L-sample frame is divided into smaller blocks called subframes. Usually the number of subframes is three or four resulting in 4-10 ms subframes. In each subframe, an excitation signal is usually obtained from two components, the past excitation and the innovative, fixed-codebook excitation. The component formed from the past excitation is often referred to as the adaptive codebook or pitch excitation. The parameters characterizing the excitation signal are coded and transmitted to the decoder, where the reconstructed excitation signal is used as the input of the LP filter.

As the main applications of low bit rate speech encoding are wireless mobile communication systems and voice over packet networks, then increasing the robustness of speech codecs in case of frame erasures becomes of significant importance. In wireless cellular systems, the energy of the received signal can exhibit frequent severe fades resulting in high bit error rates and this becomes more evident at the cell boundaries. In this case the channel decoder fails to correct the errors in the received frame and as a consequence, the error detector usually used after the channel decoder will declare the frame as erased. In voice over packet network applications, the speech signal is packetized where usually each packet corresponds to 20-40 ms of sound signal. In packet-switched communications, a packet dropping can occur at a router if the number of packets becomes very large, or the packet can reach the receiver after a long delay and it should be declared as lost if its delay is more than the length of a jitter buffer at the receiver side. In these systems, the codec is subjected to typically 3 to 5% frame erasure rates. Furthermore, the use of wideband speech encoding is an asset to these systems in order to allow them to compete with traditional PSTN (public switched telephone network) that uses the legacy narrow band speech signals.

The adaptive codebook, or the pitch predictor, in CELP plays a role in maintaining high speech quality at low bit rates. However, since the content of the adaptive codebook is based on the signal from past frames, this makes the codec model sensitive to frame loss. In case of erased or lost frames, the content of the adaptive codebook at the decoder becomes different from its content at the encoder. Thus, after a lost frame is concealed and consequent good frames are received, the synthesized signal in the received good frames is different from the intended synthesis signal since the adaptive codebook contribution has been changed. The impact of a lost frame depends on the nature of the speech segment in which the erasure occurred. If the erasure occurs in a stationary segment of the signal then efficient frame erasure concealment can be performed and the impact on consequent good frames can be minimized. On the other hand, if the erasure occurs in a speech onset or a transition, the effect of the erasure can propagate through several frames. For instance, if the beginning of a voiced segment is lost, then the first pitch period will be missing from the adaptive codebook content. This will have a severe effect on the pitch predictor in consequent good frames, resulting in longer time before the synthesis signal converge to the intended one at the encoder.

SUMMARY OF THE INVENTION

More specifically, in accordance with a first aspect of the present invention, there is provided a method for concealing frame erasures caused by frames of an encoded sound signal erased during transmission from an encoder to a decoder and for recovery of the decoder after frame erasures, the method comprising: in the encoder, determining concealment/recovery parameters including at least phase information related to frames of the encoded sound signal; transmitting to the decoder the concealment/recovery parameters determined in the encoder; and, in the decoder, conducting frame erasure concealment in response to the received concealment/recovery parameters, wherein the frame erasure concealment comprises resynchronizing the erasure-concealed frames with corresponding frames of the encoded sound signal by aligning a first phase-indicative feature of the erasure-concealed frames with a second phase-indicative feature of the corresponding frames of the encoded sound signal, said second phase-indicative feature being included in the phase information.

In accordance with a second aspect of the present invention, there is provided a device for concealing frame erasures caused by frames of an encoded sound signal erased during transmission from an encoder to a decoder and for recovery of the decoder after frame erasures, the device comprising: in the encoder, means for determining concealment/recovery parameters including at least phase information related to frames of the encoded sound signal; means for transmitting to the decoder the concealment/recovery parameters determined in the encoder; and, in the decoder, means for conducting frame erasure concealment in response to the received concealment/recovery parameters, wherein the means for conducting frame erasure concealment comprises means for resynchronizing the erasure-concealed frames with corresponding frames of the encoded sound signal by aligning a first phase-indicative feature of the erasure-concealed frames with a second phase-indicative feature of the corresponding frames of the encoded sound signal, said second phase-indicative feature being included in the phase information.

In accordance with a third aspect of the present invention, there is provided a device for concealing frame erasures caused by frames of an encoded sound signal erased during transmission from an encoder to a decoder and for recovery of the decoder after frame erasures, the device comprising: in the encoder, a generator of concealment/recovery parameters including at least phase information related to frames of the encoded sound signal; a communication link for transmitting to the decoder concealment/recovery parameters determined in the encoder; and, in the decoder, a frame erasure concealment module supplied with the received concealment/recovery parameters and comprising a synchronizer responsive to the received phase information to resynchronize the erasure-concealed frames with corresponding frames of the encoded sound signal by aligning a first phase-indicative feature of the erasure-concealed frames with a second phase-indicative feature of the corresponding frames of the encoded sound signal, said second phase-indicative feature being included in the phase information.

In accordance with a fourth aspect of the present invention, there is provided a method for concealing frame erasures caused by frames of an encoded sound signal erased during transmission from an encoder to a decoder and for recovery of the decoder after frame erasures, the method comprising, in the decoder: estimating a phase information of each frame of the encoded sound signal that has been erased during transmission from the encoder to the decoder; and conducting frame erasure concealment in response to the estimated phase information, wherein the frame erasure concealment comprises resynchronizing, in response to the estimated phase information, each erasure-concealed frame with a corresponding frame of the encoded sound signal by aligning a first phase-indicative feature of each erasure-concealed frame with a second phase-indicative feature of the corresponding frame of the encoded sound signal, said second phase-indicative feature being included in the estimated phase information.

In accordance with a fifth aspect of the present invention, there is provided a device for concealing frame erasures caused by frames of an encoded sound signal erased during transmission from an encoder to a decoder and for recovery of the decoder after frame erasures, the device comprising: means for estimating, at the decoder, a phase information of each frame of the encoded sound signal that has been erased during transmission from the encoder to the decoder; and means for conducting frame erasure concealment in response to the estimated phase information, the means for conducting frame erasure concealment comprising means for resynchronizing, in response to the estimated phase information, each erasure-concealed frame with a corresponding frame of the encoded sound signal by aligning a first phase-indicative feature of each erasure-concealed frame with a second phase-indicative feature of the corresponding frame of the encoded sound signal, said second phase-indicative feature being included in the estimated phase information.

In accordance with a sixth aspect of the present invention, there is provided a device for concealing frame erasures caused by frames of an encoded sound signal erased during transmission from an encoder to a decoder and for recovery of the decoder after frame erasures, the device comprising: at the decoder, an estimator of a phase information of each frame of the encoded signal that has been erased during transmission from the encoder to the decoder; and an erasure concealment module supplied with the estimated phase information and comprising a synchronizer which, in response to the estimated phase information, resynchronizes each erasure-concealed frame with a corresponding frame of the encoded sound signal by aligning a first phase-indicative feature of each erasure-concealed frame with a second phase-indicative feature of the corresponding frame of the encoded sound signal, said second phase-indicative feature being included in the estimated phase information.

The foregoing and other objects, advantages and features of the present invention will become more apparent upon reading of the following non-restrictive description of an illustrative embodiment thereof, given by way of example only with reference to the accompanying drawings.

DETAILED DESCRIPTION

Although the illustrative embodiment of the present invention will be described in the following description in relation to a speech signal, it should be kept in mind that the concepts of the present invention equally apply to other types of signal, in particular but not exclusively to other types of sound signals.

Figure 1:
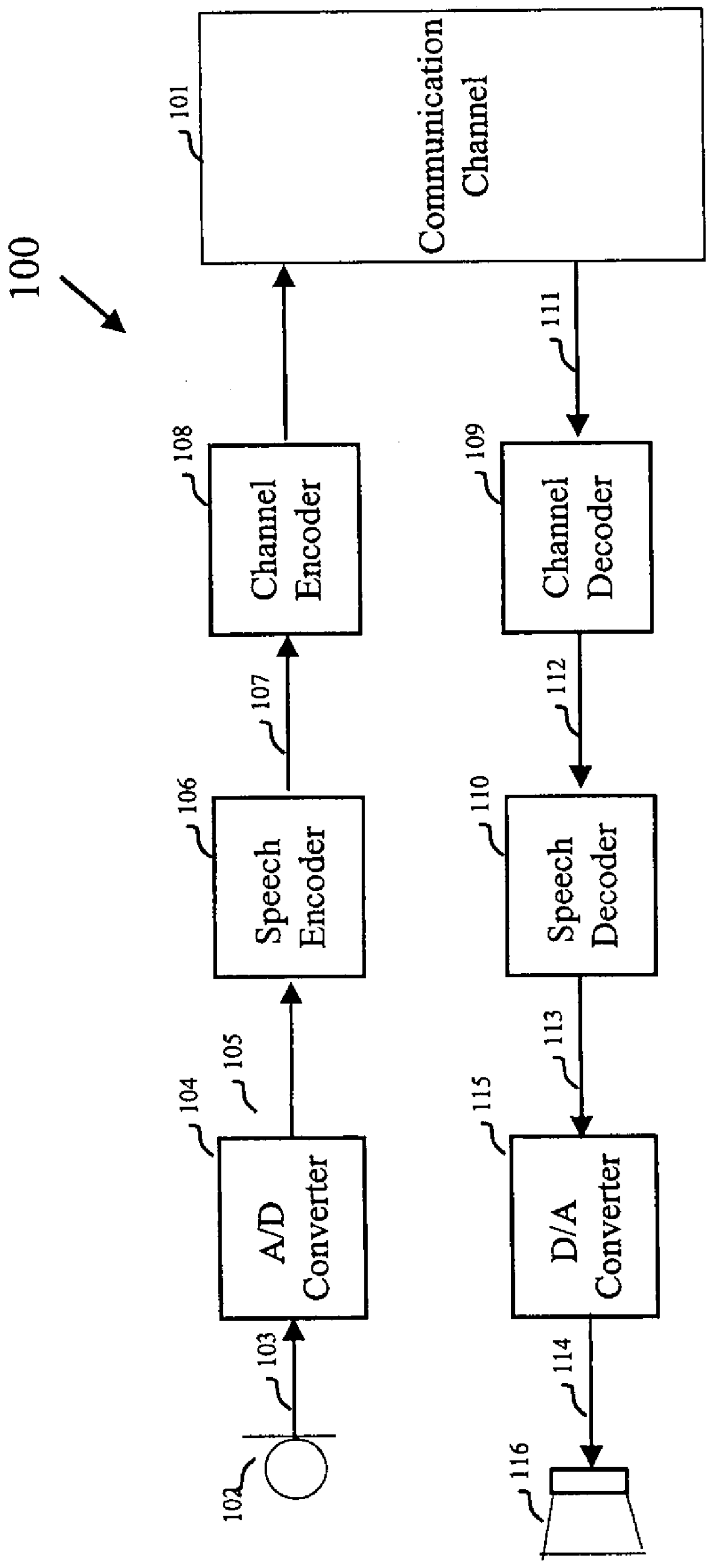
FIG. 1 is a schematic block diagram of a speech communication system illustrating an example of application of speech encoding and decoding devices.

FIG. 1 illustrates a speech communication system 100 depicting the use of speech encoding and decoding in an illustrative context of the present invention. The speech communication system 100 of FIG. 1 supports transmission of a speech signal across a communication channel 101. Although it may comprise for example a wire, an optical link or a fiber link, the communication channel 101 typically comprises at least in part a radio frequency link. Such a radio frequency link often supports multiple, simultaneous speech communications requiring shared bandwidth resources such as may be found with cellular telephony systems. Although not shown, the communication channel 101 may be replaced by a storage device in a single device embodiment of the system 100, for recording and storing the encoded speech signal for later playback.

In the speech communication system 100 of FIG. 1, a microphone 102 produces an analog speech signal 103 that is supplied to an analog-to-digital (A/D) converter 104 for converting it into a digital speech signal 105. A speech encoder 106 encodes the digital speech signal 105 to produce a set of signal-encoding parameters 107 that are coded into binary form and delivered to a channel encoder 108. The optional channel encoder 108 adds redundancy to the binary representation of the signal-encoding parameters 107, before transmitting them over the communication channel 101.

In the receiver, a channel decoder 109 utilizes the said redundant information in the received bit stream 111 to detect and correct channel errors that occurred during the transmission. A speech decoder 110 then converts the bit stream 112 received from the channel decoder 109 back to a set of signal-encoding parameters and creates from the recovered signal-encoding parameters a digital synthesized speech signal 113. The digital synthesized speech signal 113 reconstructed at the speech decoder 110 is converted to an analog form 114 by a digital-to-analog (D/A) converter 115 and played back through a loudspeaker unit 116.

The non-restrictive illustrative embodiment of efficient frame erasure concealment method disclosed in the present specification can be used with either narrowband or wideband linear prediction based codecs. Also, this illustrative embodiment is disclosed in relation to an embedded codec based on Recommendation G.729 standardized by the International Telecommunications Union (ITU) [ITU-T Recommendation G.729 "Coding of speech at 8 kbit/s using conjugate-structure algebraic-code-excited linear-prediction (CS-ACELP)" Geneva, 1996].

The G.729-based embedded codec has been standardized by ITU-T in 2006 and know as Recommendation G.729.1 [ITU-T Recommendation G.729.1 "G.729 based Embedded Variable bit-rate coder: An 8-32 kbit/s scalable wideband coder bitstream interoperable with G.729" Geneva, 2006]. Techniques disclosed in the present specification have been implemented in ITU-T Recommendation G.729.1.

Here, it should be understood that the illustrative embodiment of efficient frame erasure concealment method could be applied to other types of codecs. For example, the illustrative embodiment of efficient frame erasure concealment method presented in this specification is used in a candidate algorithm for the standardization of an embedded variable bit rate codec by ITU-T. In the candidate algorithm, the core layer is based on a wideband coding technique similar to AMR-WB (ITU-T Recommendation G.722.2).

In the following sections, an overview of CELP and the G.729-based embedded encoder and decoder will be first given. Then, the illustrative embodiment of the novel approach to improve the robustness of the codec will be disclosed.

Overview of ACELP Encoder

Figure 2:
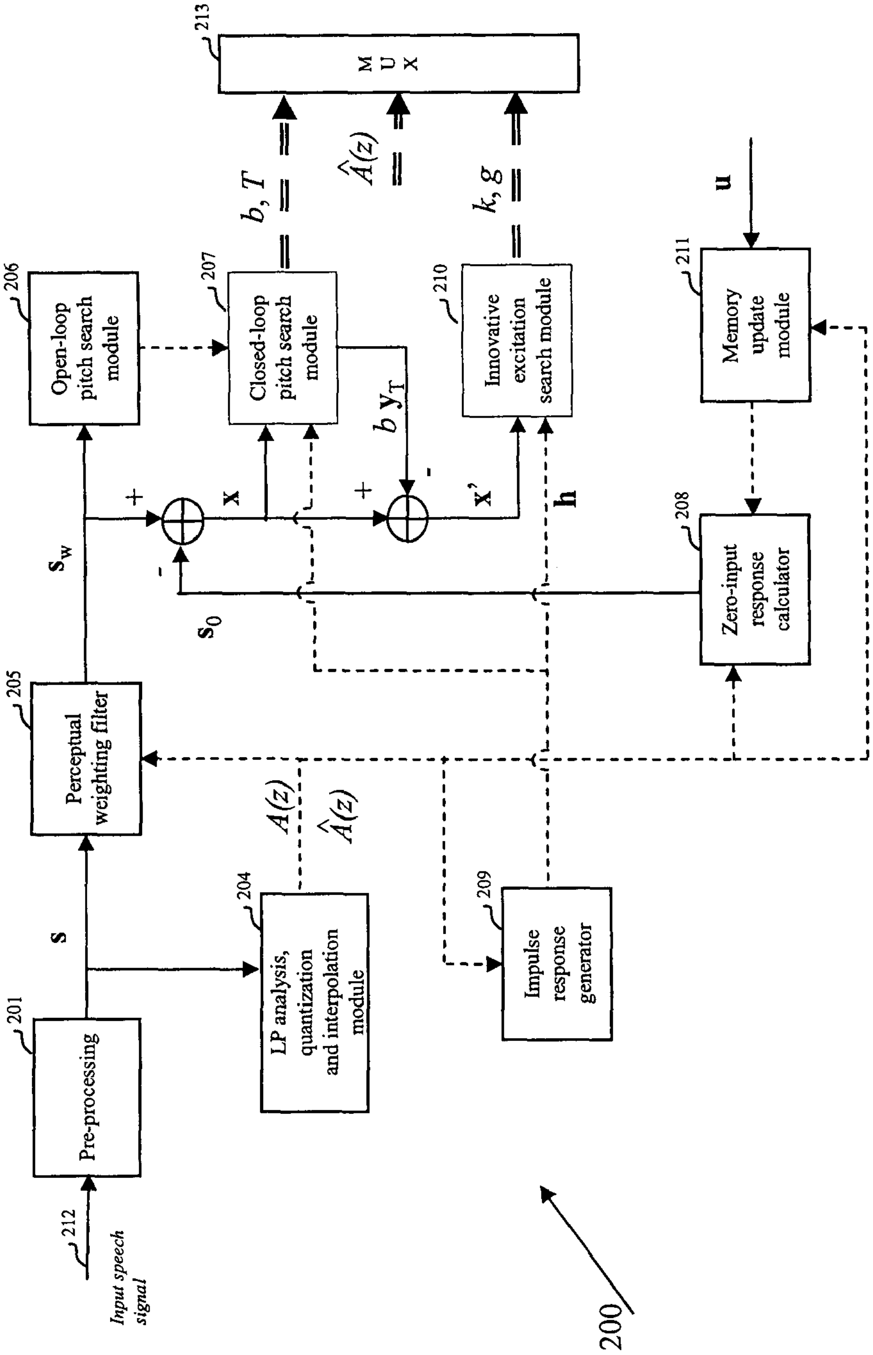
FIG. 2 is a schematic block diagram of an example of a CELP encoding device.

The sampled speech signal is encoded on a block by block basis by the encoding device 200 of FIG. 2, which is broken down into eleven modules numbered from 201 to 211.

The input speech signal 212 is therefore processed on a block-by-block basis, i.e. in the above-mentioned L-sample blocks called frames.

Referring to FIG. 2, the sampled input speech signal 212 is supplied to the optional pre-processing module 201. Pre-processing module 201 may consist of a high-pass filter with a 200 Hz cut-off frequency for narrowband signals and 50 Hz cut-off frequency for wideband signals.

The pre-processed signal is denoted by s(n), n=0, 1, 2, . . . , L-1, where L is the length of the frame which is typically 20 ms (160 samples at a sampling frequency of 8 kHz).

The signal s(n) is used for performing LP analysis in module 204. LP analysis is a technique well known to those of ordinary skilled in the art. In this illustrative implementation, the autocorrelation approach is used. In the autocorrelation approach, the signal s(n) is first windowed using, typically, a Hamming window having a length of the order of 30-40 ms. The autocorrelations are computed from the windowed signal, and Levinson-Durbin recursion is used to compute LP filter coefficients $a_i$, where 1=1, . . . , p, and where p is the LP order, which is typically 10 in narrowband coding and 16 in wideband coding. The parameters $a_i$ are the coefficients of the transfer function A(z) of the LP filter, which is given by the following relation:

$$A(z) = 1 + \sum_{i=1}^{p} a_i z^{-i}$$

LP analysis is believed to be otherwise well known to those of ordinary skill in the art and, accordingly, will not be further described in the present specification.

Module 204 also performs quantization and interpolation of the LP filter coefficients. The LP filter coefficients are first transformed into another equivalent domain more suitable for quantization and interpolation purposes. The line spectral pair (LSP) and immitance spectral pair (ISP) domains are two domains in which quantization and interpolation can be efficiently performed. In narrowband coding, the 10 LP filter coefficients $a_i$ can be quantized in the order of 18 to 30 bits using split or multi-stage quantization, or a combination thereof. The purpose of the interpolation is to enable updating the LP filter coefficients every subframe, while transmitting them once every frame, which improves the encoder performance without increasing the bit rate. Quantization and interpolation of the LP filter coefficients is believed to be otherwise well known to those of ordinary skill in the art and, accordingly, will not be further described in the present specification.

The following paragraphs will describe the rest of the coding operations performed on a subframe basis. In this illustrative implementation, the 20 ms input frame is divided into 4 subframes of 5 ms (40 samples at the sampling frequency of 8 kHz). In the following description, the filter A(z) denotes the unquantized interpolated LP filter of the subframe, and the filter $\hat{A}(z)$ denotes the quantized interpolated LP filter of the subframe. The filter $\hat{A}(z)$ is supplied every subframe to a multiplexer 213 for transmission through a communication channel (not shown).

In analysis-by-synthesis encoders, the optimum pitch and innovation parameters are searched by minimizing the mean squared error between the input speech signal 212 and a synthesized speech signal in a perceptually weighted domain. The weighted signal $s_w(n)$ is computed in a perceptual weighting filter 205 in response to the signal s(n). An example of transfer function for the perceptual weighting filter 205 is given by the following relation:

$$W(z)=A(z/\gamma_1)/A(z/\gamma_2) \text{ where } 0<\gamma_2<\gamma_1\leq 1$$

In order to simplify the pitch analysis, an open-loop pitch lag $T_{OL}$ is first estimated in an open-loop pitch search module 206 from the weighted speech signal $s_w(n)$. Then the closed-loop pitch analysis, which is performed in a closed-loop pitch search module 207 on a subframe basis, is restricted around the open-loop pitch lag $T_{OL}$ which significantly reduces the search complexity of the LTP (Long Term Prediction) parameters T (pitch lag) and b (pitch gain). The open-loop pitch analysis is usually performed in module 206 once every 10 ms (two subframes) using techniques well known to those of ordinary skill in the art.

The target vector x for LTP (Long Term Prediction) analysis is first computed. This is usually done by subtracting the zero-input response $s_0$ of weighted synthesis filter $W(z)/\hat{A}(z)$ from the weighted speech signal $s_w(n)$. This zero-input response $s_0$ is calculated by a zero-input response calculator 208 in response to the quantized interpolated LP filter $\hat{A}(z)$ from the LP analysis, quantization and interpolation module 204 and to the initial states of the weighted synthesis filter $W(z)/\hat{A}(z)$ stored in memory update module 211 in response to the LP filters A(z) and $\hat{A}(z)$, and the excitation vector u. This operation is well known to those of ordinary skill in the art and, accordingly, will not be further described in the present specification.

A N-dimensional impulse response vector h of the weighted synthesis filter $W(z)/\hat{A}(z)$ is computed in the impulse response generator 209 using the coefficients of the LP filter A(z) and $\hat{A}(z)$ from module 204. Again, this operation is well known to those of ordinary skill in the art and, accordingly, will not be further described in the present specification.

The closed-loop pitch (or pitch codebook) parameters b and T are computed in the closed-loop pitch search module 207, which uses the target vector x, the impulse response vector h and the open-loop pitch lag $T_{OL}$ as inputs.

The pitch search consists of finding the best pitch lag T and gain b that minimize a mean squared weighted pitch prediction error, for example $$e=\|x-by\|^2.$$

between the target vector x and a scaled filtered version of the past excitation.

More specifically, in the present illustrative implementation, the pitch (pitch codebook or adaptive codebook) search is composed of three (3) stages.

In the first stage, an open-loop pitch lag $T_{OL}$ is estimated in the open-loop pitch search module 206 in response to the weighted speech signal $s_w(n)$. As indicated in the foregoing description, this open-loop pitch analysis is usually performed once every 10 ms (two subframes) using techniques well known to those of ordinary skill in the art.

In the second stage, a search criterion C is searched in the closed-loop pitch search module 207 for integer pitch lags around the estimated open-loop pitch lag $T_{OL}$ (usually ±5), which significantly simplifies the search procedure. An example of search criterion C is given by:

$$C=\frac{x^t y_T}{\sqrt{y_T^t y_T}}$$

where t denotes vector transpose

Once an optimum integer pitch lag is found in the second stage, a third stage of the search (module 207) tests, by means of the search criterion C, the fractions around that optimum integer pitch lag. For example, ITU-T Recommendation G.729 uses 1/3 sub-sample resolution.

The pitch codebook index T is encoded and transmitted to the multiplexer 213 for transmission through a communication channel (not shown). The pitch gain b is quantized and transmitted to the multiplexer 213.

Once the pitch, or LTP (Long Term Prediction) parameters b and T are determined, the next step is to search for the optimum innovative excitation by means of the innovative excitation search module 210 of FIG. 2. First, the target vector x is updated by subtracting the LTP contribution:

$$x'=x-by_T$$

where b is the pitch gain and $y_T$ is the filtered pitch codebook vector (the past excitation at delay T convolved with the impulse response h).

The innovative excitation search procedure in CELP is performed in an innovation codebook to find the optimum excitation codevector $c_k$ and gain g which minimize the mean-squared error E between the target vector x' and a scaled filtered version of the codevector $c_k$, for example:

$$E=\|x'-gHc_k\|^2$$

where H is a lower triangular convolution matrix derived from the impulse response vector h. The index k of the innovation codebook corresponding to the found optimum codevector $c_k$ and the gain g are supplied to the multiplexer 213 for transmission through a communication channel.

In an illustrative implementation, the used innovation codebook is a dynamic codebook comprising an algebraic codebook followed by an adaptive pre-filter F(z) which enhances special spectral components in order to improve the synthesis speech quality, according to U.S. Pat. No. 5,444,816 granted to Adoul et al. on Aug. 22, 1995. In this illustrative implementation, the innovative codebook search is performed in module 210 by means of an algebraic codebook as described in U.S. Pat. No. 5,444,816 (Adoul et al.) issued on Aug. 22, 1995; U.S. Pat. No. 5,699,482 granted to Adoul et al on Dec. 17, 1997; U.S. Pat. No. 5,754,976 granted to Adoul et al on May 19, 1998; and U.S. Pat. No. 5,701,392 (Adoul et al.) dated Dec. 23, 1997.

Overview of ACELP Decoder

Figure 3:
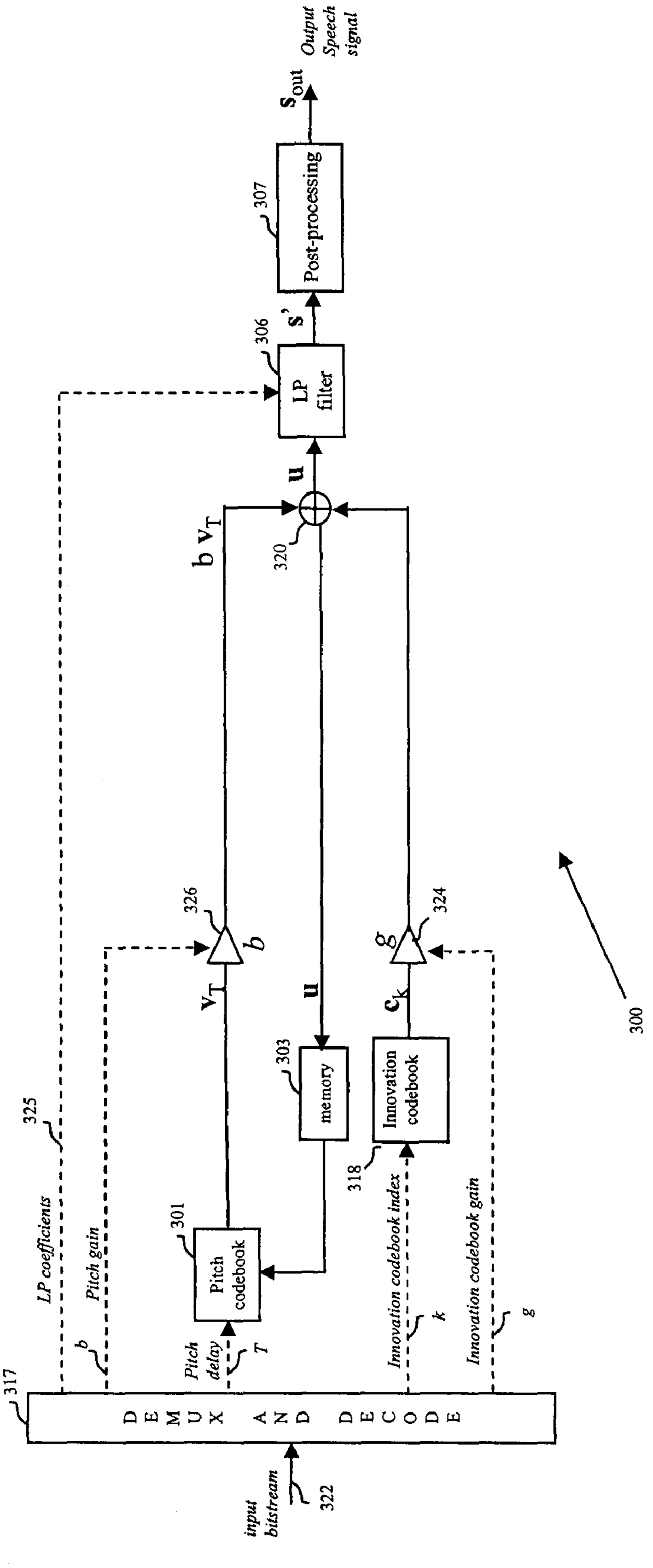
FIG. 3 is a schematic block diagram of an example of a CELP decoding device.

The speech decoder 300 of FIG. 3 illustrates the various steps carried out between the digital input 322 (input bit stream to the demultiplexer 317) and the output sampled speech signal $s_{out}$.

Demultiplexer 317 extracts the synthesis model parameters from the binary information (input bit stream 322)

received from a digital input channel. From each received binary frame, the extracted parameters are:

the quantized, interpolated LP coefficients $\hat{A}(z)$ also called short-term prediction parameters (STP) produced once per frame;

the long-term prediction (LTP) parameters T and b (for each subframe); and the innovation codebook index k and gain g (for each subframe).

The current speech signal is synthesized based on these parameters as will be explained hereinbelow.

The innovation codebook 318 is responsive to the index k to produce the innovation codevector $c_k$, which is scaled by the decoded gain g through an amplifier 324. In the illustrative implementation, an innovation codebook as described in the above mentioned U.S. Pat. Nos. 5,444,816; 5,699,482; 5,754,976; and 5,701,392 is used to produce the innovative codevector $c_k$.

The scaled pitch codevector $bv_T$ is produced by applying the pitch delay T to a pitch codebook 301 to produce a pitch codevector. Then, the pitch codevector $v_T$ is amplified by the pitch gain b by an amplifier 326 to produce the scaled pitch codevector $bv_T$.

The excitation signal u is computed by the adder 320 as:

$$u=gc_k+bv_T$$

The content of the pitch codebook 301 is updated using the past value of the excitation signal u stored in memory 303 to keep synchronism between the encoder 200 and decoder 300.

The synthesized signal s' is computed by filtering the excitation signal u through the LP synthesis filter 306 which has the form $1/\hat{A}(z)$, where $\hat{A}(z)$ is the quantized interpolated LP filter of the current subframe. As can be seen in FIG. 3, the quantized interpolated LP coefficients $\hat{A}(z)$ on line 325 from the demultiplexer 317 are supplied to the LP synthesis filter 306 to adjust the parameters of the LP synthesis filter 306 accordingly.

The vector s' is filtered through the postprocessor 307 to obtain the output sampled speech signal $s_{out}$. Postprocessing typically consists of short-term potsfiltering, long-term postfiltering, and gain scaling. It may also consist of a high-pass filter to remove the unwanted low frequencies. Postfiltering is otherwise Well known to those of ordinary skill in the art.

Overview of the G.729-Based Embedded Coding

The G.729 codec is based on Algebraic CELP (ACELP) coding paradigm explained above. The bit allocation of the G.729 codec at 8 kbit/s is given in Table 1.

TABLE 1

Bit allocation in the G.729 at 8-kbit/s

| Parameter | Bits/10 ms Frame |
|---|---|
| LP Parameters | 18 |
| Pitch Delay | 13 = 8 + 5 |
| Pitch Parity | 1 |
| Gains | 14 = 7 + 7 |
| Algebraic Codebook | 34 = 17 + 17 |
| Total | 80 bits/10 ms = 8-kbit/s |

ITU-T Recommendation G.729 operates on 10 ms frames (80 samples at 8 kHz sampling rate). The LP parameters are quantized and transmitted once per frame. The G.729 frame is divided into two 5-ms subframes. The pitch delay (or adaptive codebook index) is quantized with 8 bits in the first subframe and 5 bits in the second subframe (relative to the delay of the first subframe). The pitch and algebraic codebook gains are jointly quantized using 7 bits per subframe. A 17-bit algebraic codebook is used to represent the innovation or fixed codebook excitation.

The embedded codec is built based on the core G.729 codec. Embedded coding, or layered coding, consists of a core layer and additional layers for increased quality or increased encoded bandwidth. The bit stream corresponding to the upper layers can be dropped by the network as needed (in case of congestion or in multicast situation where some links has lower available bit rate). The decoder can reconstruct the signal based on the layers it receives.

In this illustrative embodiment, the core layer L1 consists of G.729 at 8 kbit/s. The second Layer (L2) consists of 4 kbit/s for improving the narrowband quality (at bit rate R2=L1+L2=12 kbit/s). The upper 10 layers of 2 kbit/s each are used for obtaining a wideband encoded signal. The 10 layers L3 to L12, correspond to bit rates of 14, 16, . . . , and 32 kbit/s. Thus the embedded coder operates as a wideband coder for bit rates of 14 kbit/s and above.

For example, the encoder uses predictive coding (CELP) in the first two layers (G.729 modified by adding a second algebraic codebook), and then quantizes in the frequency domain the coding error of the first layers. An MDCT (Modified Discrete Cosine Transform) is used to map the signal to the frequency domain. The MDCT coefficients are quantized using scalable algebraic vector quantization. To increase the audio bandwidth, parametric coding is applied to the high frequencies.

The encoder operates on 20 ms frames, and needs 5 ms lookahead for the LP analysis window. MDCT with 50% overlap requires an additional 20 ms of look-ahead which could be applied either at the encoder or decoder. For example, the MDCT lookahead is used at the decoder which results in improved frame erasure concealment as will be explained below. The encoder produces an output at 32 kbps, which translates in 20-ms frames containing 640 bits each. The bits in each frame are arranged in embedded layers. Layer 1 has 160 bits representing 20 ms of standard G.729 at 8 kbps (corresponding to two G.729 frames). Layer 2 has 80 bits, representing an additional 4 kbps. Then each additional layer (Layers 3 to 12) adds 2 kbps, up to 32 kbps.

Figure 4:
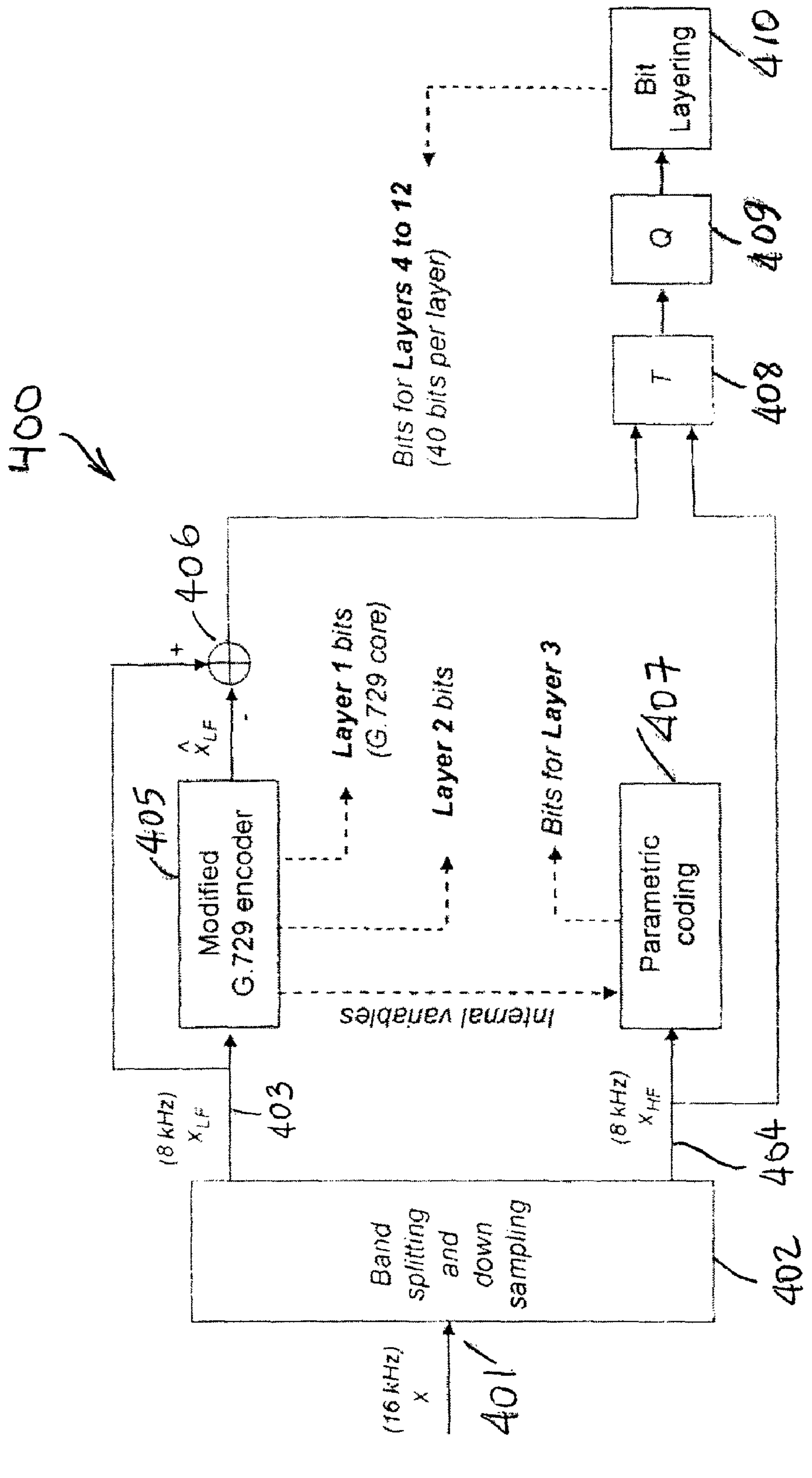
FIG. 4 is a schematic block diagram of an embedded encoder based on G.729 core (G.729 refers to ITU-T Recommendation G.729)

A block diagram of an example of embedded encoder is shown in FIG. 4.

The original wideband signal x (401), sampled at 16 kHz, is first split into two bands: 0-4000 Hz and 4000-8000 Hz in module 402. In the example of FIG. 4, band splitting is realized using a QMF (Quadrature Mirror Filter) filter bank with 64 coefficients. This operation is well known to those of ordinary skill in the art. After band splitting, two signals are obtained, one covering the 0-4000 Hz band (low band) and the other covering the 4000-8000 band (high band). The signals in each of these two bands are downsampled by a factor 2 in module 402. This yields 2 signals at 8 kHz sampling frequency: $x_{LF}$ for the low band (403), and $x_{HF}$ for the high band (404).

The low band signal $x_{LF}$ is fed into a modified version of the G.729 encoder 405. This modified version 405 first produces the standard G.729 bitstream at 8 kbps, which constitutes the bits for Layer 1. Note that the encoder operates on 20 ms frames, therefore the bits of the Layer 1 correspond to two G.729 frames.

Then, the G.729 encoder 405 is modified to include a second innovative algebraic codebook to enhance the low band signal. This second codebook is identical to the innovative codebook in G.729, and requires 17 bits per 5-ms subframe to encode the codebook pulses (68 bits per 20 ms frame). The gains of the second algebraic codebook are quantized relative to the first codebook gain using 3 bits in first and third subframes and 2 bits in second and fourth subframes (10 bits per frame). Two bits are used to send classification information to improve concealment at the decoder. This produces 68+10+2=80 bits for Layer 2. The target signal used for this second-stage innovative codebook is obtained by subtracting the contribution of the G.729 innovative codebook in the weighted speech domain.

The synthesis signal $\hat{x}_{LF}$ of the modified G.729 encoder 405 is obtained by adding the excitation of the standard G.729 (addition of scaled innovative and adaptive codevectors) and the innovative excitation of the additional innovative codebook, and passing this enhanced excitation through the usual G.729 synthesis filter. This is the synthesis signal that the decoder will produce if it receives only Layer 1 and Layer 2 from the bitstream. Note that the adaptive (or pitch) codebook content is updated only using the G.729 excitation.

Layer 3 extends the bandwidth from narrowband to wideband quality. This is done by applying parametric coding (module 407) to the high-frequency component $x_{HF}$. Only the spectral envelope and time domain envelop of $x_{HF}$ are computed and transmitted for this layer. Bandwidth extension requires 33 bits. The remaining 7 bits in this layer are used to transmit phase information (glottal pulse position) to improve the frame erasure concealment at the decoder according to the present invention. This will be explained in more details in the following description.

Then, from FIG. 4, the coding error from adder 406 ($x_{LF}-\hat{x}_{LF}$) along with the high-frequency signal $x_{HF}$ are both mapped into the frequency domain in module 408. The MDCT, with 50% overlap, is used for this time-frequency mapping. This can be performed by using two MDCTs, one for each band. The high band signal can be first spectrally folded prior to MDCT by the operator $(-1)^n$ so that the MDCT coefficients from both transforms can be joint in one vector for quantization purposes. The MDCT coefficients are then quantized in module 409 using scalable algebraic vector quantization in a manner similar to the quantization of the FFT (Fast Fourier Transform) coefficients in the 3GPP AMR-WB+ audio coder (3GPP TS 26.290). Of course, other forms of quantization can be applied. The total bit rate for this spectral quantization is 18 kbps, which amounts to a bit budget of 360 bits per 20-ms frame. After quantization, the corresponding bits are layered in steps of 2 kbps in module 410 to form Layers 4 to 12. Each 2 kbps layer thus contains 40 bits per 20-ms frame. In one illustrative embodiment, 5 bits can be reserved in Layer 4 for transmitting energy information to improve the decoder concealment and convergence in case of frame erasures.

The algorithmic extensions, compared to the core G.729 encoder, can be summarized as follows: 1) the innovative codebook of G.729 is repeated a second time (Layer 2); 2) parametric coding is applied to extend the bandwidth, where only the spectral envelope and time domain envelope (gain information) are computed and quantized (Layer 3); 3) an MDCT is computed every 20-ms, and its spectral coefficients are quantized in 8-dimensional blocks using scalable algebraic VQ (Vector Quantization); and 4) a bit layering routine is applied to format the 18 kbps stream from the algebraic VQ into layers of 2 kbps each (Layers 4 to 12). In one embodiment, 14 bits of concealment and convergence information can be transmitted in Layer 2 (2 bits), Layer 3 (7 bits) and Layer 4 (5 bits).

Figure 5:
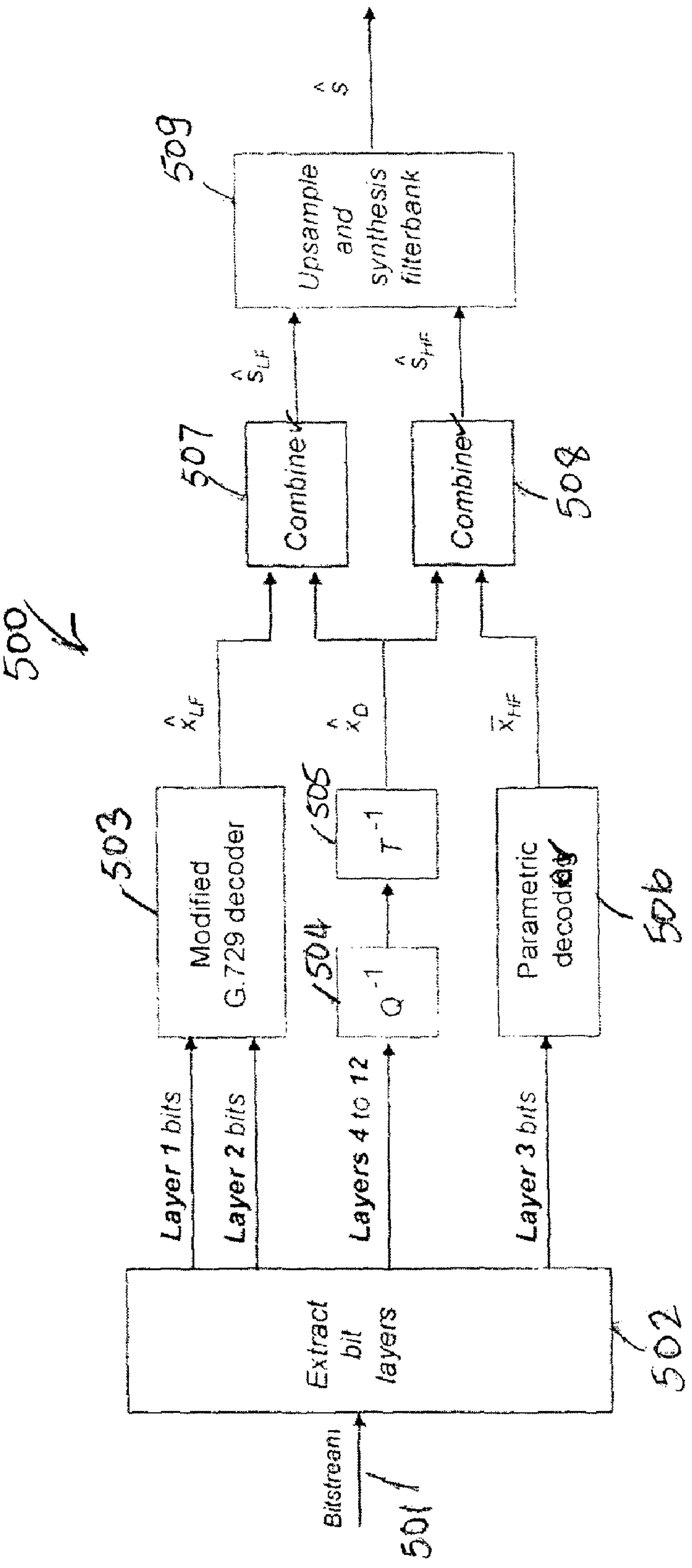
FIG. 5 is a schematic block diagram of an embedded decoder based on G.729 core.

FIG. 5 is a block diagram of an example of embedded decoder 500. In each 20-ms frame, the decoder 500 can receive any of the supported bit rates, from 8 kbps up to 32 kbps. This means that the decoder operation is conditional to the number of bits, or layers, received in each frame. In FIG. 5, it is assumed that at least Layers 1, 2, 3 and 4 have been received at the decoder. The cases of the lower bit rates will be described below.

In the decoder of FIG. 5, the received bitstream 501 is first separated into bit Layers as produced by the encoder (module 502). Layers 1 and 2 form the input to the modified G.729 decoder 503, which produces a synthesis signal $\hat{x}_{LF}$ for the lower band (0-4000 Hz, sampled at 8 kHz). Recall that Layer 2 essentially contains the bits for a second innovative codebook with the same structure as the G.729 innovative codebook.

Then, the bits from Layer 3 form the input to the parametric decoder 506. The Layer 3 bits give a parametric description of the high-band (4000-8000 Hz, sampled at 8 kHz). Specifically, Layer 3 bits describe the high-band spectral envelope of the 20-ms frame, along with time-domain envelop (or gain information). The result of parametric decoding is a parametric approximation of the high-band signal, called $\bar{x}_{HF}$ in FIG. 5.

Then, the bits from Layer 4 and up form the input of the inverse quantizer 504 ($Q^{-1}$). The output of the inverse quantizer 504 is a set of quantized spectral coefficients. These quantized coefficients form the input of the inverse transform module 505 ($T^{-1}$), specifically an inverse MDCT with 50% overlap. The output of the inverse MDCT is the signal $\hat{x}_D$. This signal $\hat{x}_D$ can be seen as the quantized coding error of the modified G.729 encoder in the low band, along with the quantized high band if any bits were allocated to the high band in the given frame. Inverse transform module 505 ($T^{-1}$) is implemented as two inverse MDCTs then $\hat{x}_D$ will consist of two components, $\hat{x}_{D1}$ representing the low frequency component and $\hat{x}_{D2}$ representing the high frequency component.

The component $\hat{x}_{D1}$ forming the quantized coding error of the modified G.729 encoder is then combined with $\hat{x}_{LF}$ in combiner 507 to form the low-band synthesis $\hat{s}_{LF}$. In the same manner, the component $\hat{x}_{D2}$ forming the quantized high band is combined with the parametric approximation of the high band $\bar{x}_{HF}$ in combiner 508 to form the high band synthesis $\hat{s}_{HF}$. Signals $\hat{s}_{LF}$ and $\hat{s}_{HF}$ are processed through the synthesis QMF filterbank 509 to form the total synthesis signals at 16 kHz sampling rate.

In the case where Layers 4 and up are not received, then $\hat{x}_D$ is zero, and the outputs of the combiners 507 and 508 are equal to their input, namely $\hat{x}_{LF}$ and $\bar{x}_{HF}$. If only Layers 1 and 2 are received, then the decoder only has to apply the modified G.729 decoder to produce signal $\hat{x}_{LF}$. The high band component will be zero, and the up-sampled signal at 16 kHz (if required) will have content only in the low band. If only Layer 1 is received, then the decoder only has to apply the G.729 decoder to produce signal $\hat{x}_{LF}$.

Robust Frame Erasure Concealment

The erasure of frames has a major effect on the synthesized speech quality in digital speech communication systems, especially when operating in wireless environments and packet-switched networks. In wireless cellular systems, the energy of the received signal can exhibit frequent severe fades resulting in high bit error rates and this becomes more evident at the cell boundaries. In this case the channel decoder fails to correct the errors in the received frame and as a consequence, the error detector usually used after the channel decoder will declare the frame as erased. In voice over packet network applications, such as Voice over Internet Protocol (VoIP), the speech signal is packetized where usually a 20 ms frame is placed in each packet. In packet-switched communications, a packet dropping can occur at a router if the number of packets becomes very large, or the packet can arrive at the receiver after a long delay and it should be declared as lost if its delay is more than the length of a jitter buffer at the receiver side. In these systems, the codec could be subjected to typically 3 to 5% frame erasure rates.

The problem of frame erasure (FER) processing is basically twofold. First, when an erased frame indicator arrives, the missing frame must be generated by using the information sent in the previous frame and by estimating the signal evolution in the missing frame. The success of the estimation depends not only on the concealment strategy, but also on the place in the speech signal where the erasure happens. Secondly, a smooth transition must be assured when normal operation recovers, i.e. when the first good frame arrives after a block of erased frames (one or more). This is not a trivial task as the true synthesis and the estimated synthesis can evolve differently. When the first good frame arrives, the decoder is hence desynchronized from the encoder. The main reason is that low bit rate encoders rely on pitch prediction, and during erased frames, the memory of the pitch predictor (or the adaptive codebook) is no longer the same as the one at the encoder. The problem is amplified when many consecutive frames are erased. As for the concealment, the difficulty of the normal processing recovery depends on the type of signal, for example speech signal where the erasure occurred.

The negative effect of frame erasures can be significantly reduced by adapting the concealment and the recovery of normal processing (further recovery) to the type of the speech signal where the erasure occurs. For this purpose, it is necessary to classify each speech frame. This classification can be done at the encoder and transmitted. Alternatively, it can be estimated at the decoder.

For the best concealment and recovery, there are few critical characteristics of the speech signal that must be carefully controlled. These critical characteristics are the signal energy or the amplitude, the amount of periodicity, the spectral envelope and the pitch period. In case of a voiced speech recovery, further improvement can be achieved by a phase control. With a slight increase in the bit rate, few supplementary parameters can be quantized and transmitted for better control. If no additional bandwidth is available, the parameters can be estimated at the decoder. With these parameters controlled, the frame erasure concealment and recovery can be significantly improved, especially by improving the convergence of the decoded signal to the actual signal at the encoder and alleviating the effect of mismatch between the encoder and decoder when normal processing recovers.

These ideas have been disclosed in PCT patent application in Reference [1]. In accordance with the non-restrictive illustrative embodiment of the present invention, the concealment and convergence are further enhanced by better synchronization of the glottal pulse in the pitch codebook (or adaptive codebook) as will be disclosed herein below. This can be performed with or without the received phase information, corresponding for example to the position of the pitch pulse or glottal pulse.

In the illustrative embodiment of the present invention, methods for efficient frame erasure concealment, and methods for improving the convergence at the decoder in the frames following an erased frame are disclosed.

The frame erasure concealment techniques according to the illustrative embodiment have been applied to the G.729-based embedded codec described above. This codec will serve as an example framework for the implementation of the FER concealment methods in the following description.

Figure 6:
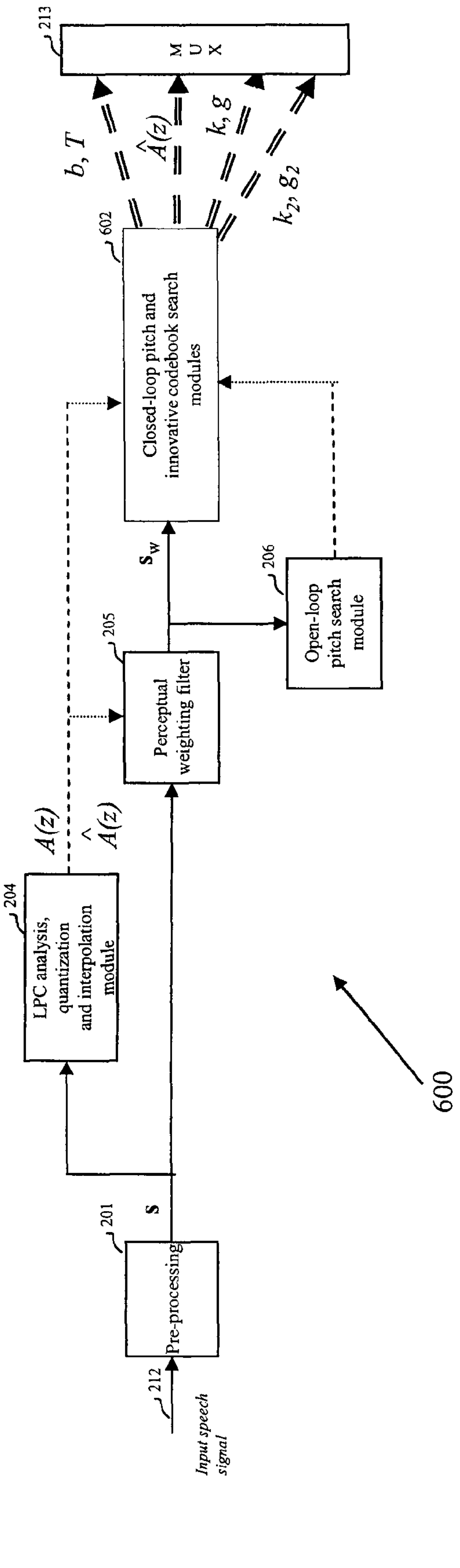
FIG. 6 is a simplified block diagram of the CELP encoding device of FIG. 2, wherein the closed-loop pitch search module, the zero-input response calculator module, the impulse response generator module, the innovative excitation search module and the memory update module have been grouped in a single closed-loop pitch and innovative codebook search module.

FIG. 6 gives a simplified block diagram of Layers 1 and 2 of an embedded encoder 600, based on the CELP encoder model of FIG. 2. In this simplified block diagram, the closed-loop pitch search module 207, the zero-input response calculator 208, the impulse response calculator 209, the innovative excitation search module 210, and the memory update module 211 are grouped in a closed-loop pitch and innovation codebook search modules 602. Further, the second stage codebook search in Layer 2 is also included in modules 602. This grouping is done to simplify the introduction of the modules related to the illustrative embodiment of the present invention.

Figure 7:
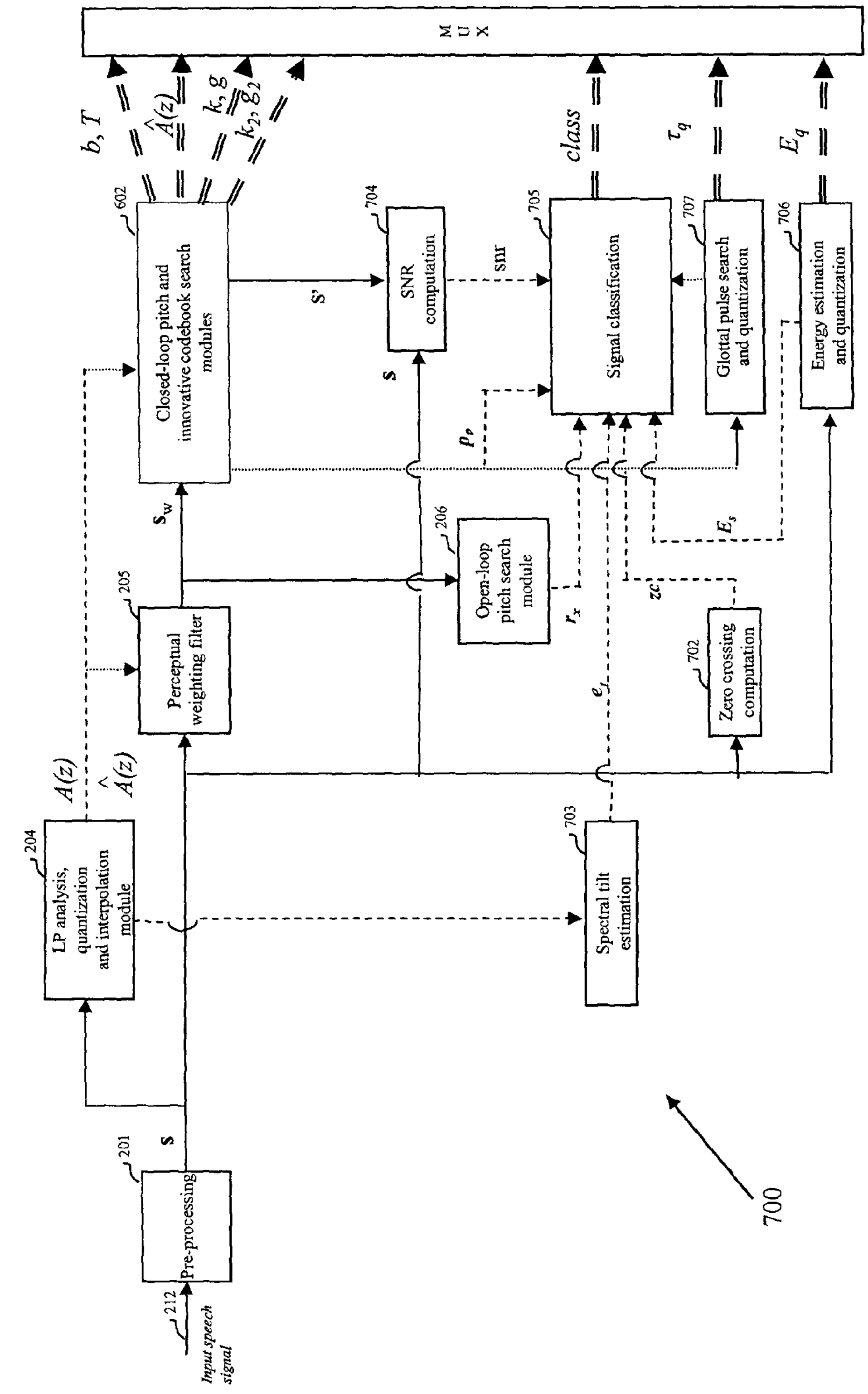
FIG. 7 is an extension of the block diagram of FIG. 4 in which modules related to parameters to improve concealment/recovery have been added.

FIG. 7 is an extension of the block diagram of FIG. 6 where the modules related to the non-restrictive illustrative embodiment of the present invention have been added. In these added modules 702 to 707, additional parameters are computed, quantized, and transmitted with the aim to improve the FER concealment and the convergence and recovery of the decoder after erased frames. In this illustrative embodiment, these concealment/recovery parameters include signal classification, energy, and phase information (for example the estimated position of the last glottal pulse in previous frame(s)).

In the following description, computation and quantization of these additional concealment/recovery parameters will be given in detail and become more apparent with reference to FIG. 7. Among these parameters, signal classification will be treated in more detail. In the subsequent sections, efficient FER concealment using these additional concealment/recovery parameters to improve the convergence will be explained.

Signal Classification for FER Concealment and Recovery

The basic idea behind using a classification of the speech for a signal reconstruction in the presence of erased frames consists of the fact that the ideal concealment strategy is different for quasi-stationary speech segments and for speech segments with rapidly changing characteristics. While the best processing of erased frames in non-stationary speech segments can be summarized as a rapid convergence of speech-encoding parameters to the ambient noise characteristics, in the case of quasi-stationary signal, the speech-encoding parameters do not vary dramatically and can be kept practically unchanged during several adjacent erased frames before being damped. Also, the optimal method for a signal recovery following an erased block of frames varies with the classification of the speech signal.

The speech signal can be roughly classified as voiced, unvoiced and pauses.

Voiced speech contains an amount of periodic components and can be further divided in the following categories: voiced onsets, voiced segments, voiced transitions and voiced offsets. A voiced onset is defined as a beginning of a voiced speech segment after a pause or an unvoiced segment. During voiced segments, the speech signal parameters (spectral envelope, pitch period, ratio of periodic and non-periodic components, energy) vary slowly from frame to frame. A voiced transition is characterized by rapid variations of a voiced speech, such as a transition between vowels. Voiced offsets are characterized by a gradual decrease of energy and voicing at the end of voiced segments.

The unvoiced parts of the signal are characterized by missing the periodic component and can be further divided into unstable frames, where the energy and the spectrum changes rapidly, and stable frames where these characteristics remain relatively stable.

Remaining frames are classified as silence. Silence frames comprise all frames without active speech, i.e. also noise-only frames if a background noise is present.

Not all of the above mentioned classes need a separate processing. Hence, for the purposes of error concealment techniques, some of the signal classes are grouped together.

Classification at the Encoder

When there is an available bandwidth in the bitstream to include the classification information, the classification can be done at the encoder. This has several advantages. One is that there is often a look-ahead in speech encoders. The look-ahead permits to estimate the evolution of the signal in the following frame and consequently the classification can be done by taking into account the future signal behavior. Generally, the longer is the look-ahead, the better can be the classification. A further advantage is a complexity reduction, as most of the signal processing necessary for frame erasure concealment is needed anyway for speech encoding. Finally, there is also the advantage to work with the original signal instead of the synthesized signal.

The frame classification is done with the consideration of the concealment and recovery strategy in mind. In other words, any frame is classified in such a way that the concealment can be optimal if the following frame is missing, or that the recovery can be optimal if the previous frame was lost. Some of the classes used for the FER processing need not be transmitted, as they can be deduced without ambiguity at the decoder. In the present illustrative embodiment, five (5) distinct classes are used, and defined as follows:

- UNVOICED class comprises all unvoiced speech frames and all frames without active speech. A voiced offset frame can be also classified as UNVOICED if its end tends to be unvoiced and the concealment designed for unvoiced frames can be used for the following frame in case it is lost.
- UNVOICED TRANSITION class comprises unvoiced frames with a possible voiced onset at the end. The onset is however still too short or not built well enough to use the concealment designed for voiced frames. The UNVOICED TRANSITION class can follow only a frame classified as UNVOICED or UNVOICED TRANSITION.
- VOICED TRANSITION class comprises voiced frames with relatively weak voiced characteristics. Those are typically voiced frames with rapidly changing characteristics (transitions between vowels) or voiced offsets lasting the whole frame. The VOICED TRANSITION class can follow only a frame classified as VOICED TRANSITION, VOICED or ONSET.
- VOICED class comprises voiced frames with stable characteristics. This class can follow only a frame classified as VOICED TRANSITION, VOICED or ONSET.
- ONSET class comprises all voiced frames with stable characteristics following a frame classified as UNVOICED or UNVOICED TRANSITION. Frames classified as ONSET correspond to voiced onset frames where the onset is already sufficiently well built for the use of the concealment designed for lost voiced frames. The concealment techniques used for a frame erasure following the ONSET class are the same as following the VOICED class. The difference is in the recovery strategy. If an ONSET class frame is lost (i.e. a VOICED good frame arrives after an erasure, but the last good frame before the erasure was UNVOICED), a special technique can be used to artificially reconstruct the lost onset. This scenario can be seen in FIG. 6. The artificial onset reconstruction techniques will be described in more detail in the following description. On the other hand if an ONSET good frame arrives after an erasure and the last good frame before the erasure was UNVOICED, this special processing is not needed, as the onset has not been lost (has not been in the lost frame).

Figure 8:
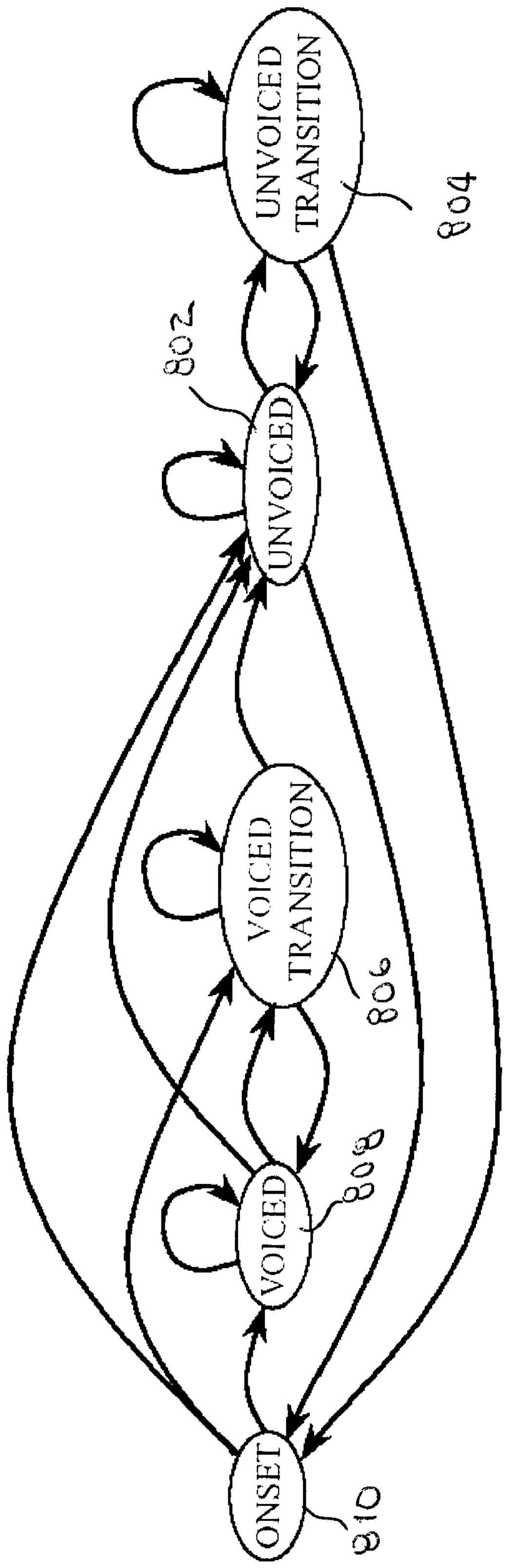
FIG. 8 is a schematic diagram showing an example of frame classification state machine for the erasure concealment.

The classification state diagram is outlined in FIG. 8. If the available bandwidth is sufficient, the classification is done in the encoder and transmitted using 2 bits. As it can be seen from FIG. 8, UNVOICED TRANSITION 804 and VOICED TRANSITION 806 can be grouped together as they can be unambiguously differentiated at the decoder (UNVOICED TRANSITION 804 frames can follow only UNVOICED 802 or UNVOICED TRANSITION 804 frames, VOICED TRANSITION 806 frames can follow only ONSET 810, VOICED 808 or VOICED TRANSITION 806 frames). In this illustrative embodiment, classification is performed at the encoder and quantized using 2 bits which are transmitted in layer 2. Thus, if at least layer 2 is received then the decoder classification information is used for improved concealment. If only core layer 1 is received then the classification is performed at the decoder.

The following parameters are used for the classification at the encoder: a normalized correlation $r_x$, a spectral tilt measure $e_t$, a signal-to-noise ratio snr, a pitch stability counter pc, a relative frame energy of the signal at the end of the current frame $E_s$, and a zero-crossing counter zc.

The computation of these parameters which are used to classify the signal is explained below.

The normalized correlation $r_x$ is computed as part of the open-loop pitch search module 206 of FIG. 7. This module 206 usually outputs the open-loop pitch estimate every 10 ms (twice per frame). Here, it is also used to output the normalized correlation measures. These normalized correlations are computed on the current weighted speech signal $s_w(n)$ and the past weighted speech signal at the open-loop pitch delay. The average correlation $\bar{r}_x$ is defined as:

$$\bar{r}_x = 0.5(r_x(0)+r_x(1)) \tag{1}$$

where $r_x(0)$, $r_x(1)$ are respectively the normalized correlation of the first half frame and second half frame. The normalized correlation $r_x(k)$ is computed as follows:

$$r_x(k) = \frac{\sum_{i=0}^{L'-1} x(t_k+i)x(t_k+i-T_k)}{\sqrt{\sum_{i=0}^{L'-1} x^2(t_k+i)\sum_{i=0}^{T-1} x^2(t_k+i-T_k)}} \tag{2}$$

The correlations $r_x(k)$ are computed using the weighted speech signal $s_w(n)$ (as "x"). The instants $t_k$ are related to the current half frame beginning and are equal to 0 and 80 samples respectively. The value $T_k$ is the pitch lag in the half-frame that maximizes the cross correlation $$\sum_{i=0}^{L'-1} x(t_k+i)x(t_k+i-T).$$

The length of the autocorrelation computation L' is equal to 80 samples. In another embodiment to determine the value $T_k$ in a half-frame, the cross correlation $$\sum_{i=0}^{L'-1} x(\tau+i)x(\tau+i-T)$$

is computed and the values of $\tau$ corresponding to the maxima in the three delay sections 20-39, 40-79, 80-143 are found. Then $T_k$ is set to the value of $\tau$ that maximizes the normalized correlation in Equation (2).

The spectral tilt parameter $e_t$ contains the information about the frequency distribution of energy. In the present illustrative embodiment, the spectral tilt is estimated in module 703 as the normalized first autocorrelation coefficients of the speech signal (the first reflection coefficient obtained during LP analysis).

Since LP analysis is performed twice per frame (once every 10-ms G.729 frame), the spectral tilt is computed as the average of the first reflection coefficient from both LP analysis. That is $$e_t = -0.5(k_1^{(1)} + k_1^{(2)}) \tag{3}$$

where $k_1^{(j)}$ is the first reflection coefficient from the LP analysis in half-frame j.

The signal-to-noise ratio (SNR) snr measure exploits the fact that for a general waveform matching encoder, the SNR is much higher for voiced sounds.

The snr parameter estimation must be done at the end of the encoder subframe loop and is computed for the whole frame in the SNR computation module 704 using the relation:

$$snr = \frac{E_{sw}}{E_e} \tag{4}$$

where $E_{sw}$ is the energy of the speech signal s(n) of the current frame and $E_e$ is the energy of the error between the speech signal and the synthesis signal of the current frame.

The pitch stability counter pc assesses the variation of the pitch period. It is computed within the signal classification module 705 in response to the open-loop pitch estimates as follows:

$$pc = |p_3 - p_2| + |p_2 - p_1| \tag{5}$$

The values $p_1$, $p_2$ and $p_3$ correspond to the closed-loop pitch lag from the last 3 subframes.

The relative frame energy $E_s$ is computed by module 705 as a difference between the current frame energy in dB and its long-term average:

$$E_s = E_f - E_{lt} \tag{6}$$

where the frame energy $E_f$ as the energy of the windowed input signal in dB:

$$E_f = 10\log_{10}\left(\frac{1}{L}\sum_{i=0}^{L-1} s^2(i) w_{hanning}(i)\right) \tag{7}$$

where L=160 is the frame length and $w_{hanning}(i)$ is a Hanning window of length L. The long-term averaged energy is updated on active speech frames using the following relation:

$$E_{lt} = 0.99E_{lt} + 0.01E_f \tag{8}$$

The last parameter is the zero-crossing parameter zc computed on one frame of the speech signal by the zero-crossing computation module 702. In this illustrative embodiment, the zero-crossing counter zc counts the number of times the signal sign changes from positive to negative during that interval.

To make the classification more robust, the classification parameters are considered in the signal classification module 705 together forming a function of merit $f_m$. For that purpose, the classification parameters are first scaled between 0 and 1 so that each parameter's value typical for unvoiced signal translates in 0 and each parameter's value typical for voiced signal translates into 1. A linear function is used between them. Let us consider a parameter px, its scaled version is obtained using:

$$p^s = k_p \cdot p_x + c_p \tag{9}$$

and clipped between 0 and 1 (except for the relative energy which is clipped between 0.5 and 1). The function coefficients $k_p$ and $c_p$ have been found experimentally for each of the parameters so that the signal distortion due to the concealment and recovery techniques used in presence of FERs is minimal. The values used in this illustrative implementation are summarized in Table 2:

TABLE 2

Signal Classification Parameters and the coefficients of their respective scaling functions

| Parameter | Meaning | $k_p$ | $c_p$ |
|---|---|---|---|
| $\bar{r}_x$ | Normalized Correlation | 0.91743 | 0.26606 |
| $\bar{e}_t$ | Spectral Tilt | 2.5 | −1.25 |
| snr | Signal to Noise Ratio | 0.09615 | −0.25 |
| pc | Pitch Stability counter | −0.1176f | 2.0 |
| $E_s$ | Relative Frame Energy | 0.05 | 0.45 |
| zc | Zero Crossing Counter | −0.067 | 2.613 |

The merit function has been defined as:

$$f_m = \frac{1}{7}(2\cdot \bar{r}_x^s + \bar{e}_t^s + 1.2snr^s + pc^s + E_s^s + zc^s) \tag{10}$$

where the superscript s indicates the scaled version of the parameters.

The function of merit is then scaled by 1.05 if the scaled relative energy $E_s^s$ equals 0.5 and scaled by 1.25 if $E_s^s$ is larger than 0.75. Further, the function of merit is also scaled by a factor $f_E$ derived based on a state machine which checks the difference between the instantaneous relative energy variation and the long term relative energy variation. This is added to improve the signal classification in the presence of background noise.

A relative energy variation parameter $E_{var}$ is updated as:

$$E_{var} = 0.05(E_s - E_{prev}) + 0.95E_{var}$$

where $E_{prev}$ is the value of $E_s$ from the previous frame.

If ($|E_s - E_{prev}| < (|E_{var}| + 6)$) AND ($class_{old}$=UNVOICED)
$f_E = 0.8$ Else If ($(E_s - E_{prev}) > (E_{var} + 3)$) AND ($class_{old}$=UNVOICED or TRANSITION) $f_E = 1.1$ Else If ($(E_s - E_{prev}) < (E_{var} - 5)$) AND ($class_{old}$=VOICED or ONSET) $f_E = 0.6$.

where $class_{old}$ is the class of the previous frame.

The classification is then done using the function of merit $f_m$ and following the rules summarized in Table 3:

TABLE 3

Signal Classification Rules at the Encoder

| Previous Frame Class | Rule | Current Frame Class |
|---|---|---|
| ONSET<br>VOICED<br>VOICED TRANSITION | $f_m \geqq 0.68$ | VOICED |
| | $0.56 \leqq f_m < 0.68$ | VOICED TRANSITION |
| | $f_m < 0.56$ | UNVOICED |
| UNVOICED TRANSITION<br>UNVOICED | $f_m > 0.64$ | ONSET |
| | $0.64 \geqq f_m > 0.58$ | UNVOICED TRANSITION |
| | $f_m \leqq 0.58$ | UNVOICED |

In case voice activity detection (VAD) is present at the encoder, the VAD flag can be used for the classification as it directly indicates that no further classification is needed if its value indicates inactive speech (i.e, the frame is directly classified as UNVOICED). In this illustrative embodiment, the frame is directly classified as UNVOICED if the relative energy is less than 10 dB.

Classification at the Decoder

If the application does not permit the transmission of the class information (no extra bits can be transported), the classification can be still performed at the decoder. In this illustrative embodiment, the classification bits are transmitted in Layer 2, therefore the classification is also performed at the decoder for the case where only the core Layer 1 is received.

The following parameters are used for the classification at the decoder: a normalized correlation $r_x$, a spectral tilt measure $e_t$, a pitch stability counter pc, a relative frame energy of the signal at the end of the current frame $E_s$, and a zero-crossing counter zc.

The computation of these parameters which are used to classify the signal is explained below.

The normalized correlation $r_x$ is computed at the end of the frame based on the synthesis signal. The pitch lag of the last subframe is used.

The normalized correlation $r_x$ is computed pitch synchronously as follows:

$$r_x = \frac{\sum_{i=0}^{T-1} x(t+i)x(t+i-T)}{\sqrt{\sum_{i=0}^{T-1} x^2(t+i) \sum_{i=0}^{T-1} x^2(t+i-T)}}, \qquad (11)$$

where T is the pitch lag of the last subframe and t=L−T, and L is the frame size. If the pitch lag of the last subframe is larger than 3N/2 (N is the subframe size), T is set to the average pitch lag of the last two subframes.

The correlation $r_x$ is computed using the synthesis speech signal $s_{out}(n)$. For pitch lags lower than the subframe size (40 samples) the normalized correlation is computed twice at instants t=L−T and t=L−2T, and $r_x$ is given as the average of the two computations.

The spectral tilt parameter $e_t$ contains the information about the frequency distribution of energy. In the present illustrative embodiment, the spectral tilt at the decoder is estimated as the first normalized autocorrelation coefficient of the synthesis signal. It is computed based on the last 3 subframes as:

$$e_t = \frac{\sum_{i=N}^{L-1} x(i)x(i-1)}{\sum_{i=N}^{L-1} x^2(i)} \qquad (12)$$

where $x(n)=s_{out}(n)$ is the synthesis signal, N is the subframe size, and L is the frame size (N=40 and L=160 in this illustrative embodiment).

The pitch stability counter pc assesses the variation of the pitch period. It is computed at the decoder based as follows:

$$pc=|p_3+p_2-p_1-p_0| \qquad (13)$$

The values $p_0$, $p_1$, $p_2$ and $p_3$ correspond to the closed-loop pitch lag from the 4 subframes.

The relative frame energy $E_s$ is computed as a difference between the current frame energy in dB and its long-term average energy:

$$E_s=\overline{E}_f-E_{lt} \qquad (14)$$

where the frame energy $\overline{E}_f$ is the energy of the synthesis signal in dB computed at pitch synchronously at the end of the frame as:

$$E_f = 10\log_{10}\left(\frac{1}{T}\sum_{i=0}^{T-1} s_{out}^2(i+L-T)\right) \qquad (15)$$

where L=160 is the frame length and T is the average pitch lag of the last two subframes. If T is less than the subframe size then T is set to 2T (the energy computed using two pitch periods for short pitch lags).

The long-term averaged energy is updated on active speech frames using the following relation:

$$E_{lt}=0.99E_{lt}+0.01E_f \qquad (16)$$

The last parameter is the zero-crossing parameter zc computed on one frame of the synthesis signal. In this illustrative embodiment, the zero-crossing counter zc counts the number of times the signal sign changes from positive to negative during that interval.

To make the classification more robust, the classification parameters are considered together forming a function of merit $f_m$. For that purpose, the classification parameters are first scaled a linear function. Let us consider a parameter $p_x$, its scaled version is obtained using:

$$p^s=k_p \cdot p_x+c_p \qquad (17)$$

The scaled pitch coherence parameter is clipped between 0 and 1, the scaled normalized correlation parameter is double if it is positive. The function coefficients $k_p$ and $c_p$ have been found experimentally for each of the parameters so that the signal distortion due to the concealment and recovery techniques used in presence of FERs is minimal. The values used in this illustrative implementation are summarized in Table 4:

TABLE 4

| Signal Classification Parameters at the decoder and the coefficients of their respective scaling functions | | | |
|---|---|---|---|
| Parameter | Meaning | $k_p$ | $c_p$ |
| $\bar{r}_x$ | Normalized Correlation | 2.857 | −1.286 |
| $\bar{e}_t$ | Spectral Tilt | 0.8333 | 0.2917 |
| pc | Pitch Stability counter | −0.0588 | 1.6468 |
| $E_s$ | Relative Frame Energy | 0.57143 | 0.85741 |
| zc | Zero Crossing Counter | −0.067 | 2.613 |

The function of merit function has been defined as:

$$f_m = \frac{1}{6}(2 \cdot \bar{r}_x^s + \bar{e}_t^s + pc^s + E_s^s + zc^s) \quad (18)$$

where the superscript s indicates the scaled version of the parameters.

The classification is then done using the function of merit $f_m$ and following the rules summarized in Table 5:

TABLE 5

| Signal Classification Rules at the decoder | | |
|---|---|---|
| Previous Frame Class | Rule | Current Frame Class |
| ONSET<br>VOICED<br>VOICED TRANSITION<br>ARTIFICIAL ONSET | $f_m \geqq 0.63$ | VOICED |
| | $0.39 \leqq f_m < 0.63$ | VOICED TRANSITION |
| | $f_m < 0.39$ | UNVOICED |
| UNVOICED TRANSITION<br>UNVOICED | $f_m > 0.56$ | ONSET |
| | $0.56 \geqq f_m > 0.45$ | UNVOICED TRANSITION |
| | $f_m \leqq 0.45$ | UNVOICED |

Speech Parameters for FER Processing

There are few parameters that are carefully controlled to avoid annoying artifacts when FERs occur. If few extra bits can be transmitted then these parameters can be estimated at the encoder, quantized, and transmitted. Otherwise, some of them can be estimated at the decoder. These parameters could include signal classification, energy information, phase information, and voicing information.

The importance of the energy control manifests itself mainly when a normal operation recovers after an erased block of frames. As most of speech encoders make use of a prediction, the right energy cannot be properly estimated at the decoder. In voiced speech segments, the incorrect energy can persist for several consecutive frames which is very annoying especially when this incorrect energy increases.

Energy in not only controlled for voiced speech because of the long term prediction (pitch prediction), it is also controlled for unvoiced speech. The reason here is the prediction of the innovation gain quantizer often used in CELP type coders. The wrong energy during unvoiced segments can cause an annoying high frequency fluctuation.

Phase control is also a part to consider. For example, the phase information is sent related to the glottal pulse position. In the PCT patent application in [1], the phase information is transmitted as the position of the first glottal pulse in the frame, and used to reconstruct lost voiced onsets. A further use of phase information is to resynchronize the content of the adaptive codebook. This improves the decoder convergence in the concealed frame and the following frames and significantly improves the speech quality. The procedure for resynchronization of the adaptive codebook (or past excitation) can be done in several ways, depending on the received phase information (received or not) and on the available delay at the decoder.

Energy Information

The energy information can be estimated and sent either in the LP residual domain or in the speech signal domain. Sending the information in the residual domain has the disadvantage of not taking into account the influence of the LP synthesis filter. This can be particularly tricky in the case of voiced recovery after several lost voiced frames (when the FER happens during a voiced speech segment). When a FER arrives after a voiced frame, the excitation of the last good frame is typically used during the concealment with some attenuation strategy. When a new LP synthesis filter arrives with the first good frame after the erasure, there can be a mismatch between the excitation energy and the gain of the LP synthesis filter. The new synthesis filter can produce a synthesis signal whose energy is highly different from the energy of the last synthesized erased frame and also from the original signal energy. For this reason, the energy is computed and quantized in the signal domain.

The energy $E_q$ is computed and quantized in energy estimation and quantization module 706 of FIG. 7. In this non restrictive illustrative embodiment, a 5 bit uniform quantizer is used in the range of 0 dB to 96 dB with a step of 3.1 dB. The quantization index is given by the integer part of:

$$i = \frac{10\log_{10}(E + 0.001)}{3.1} \quad (19)$$

where the index is bounded to $0 \leqq i = 31$.

E is the maximum sample energy for frames classified as VOICED or ONSET, or the average energy per sample for other frames. For VOICED or ONSET frames, the maximum sample energy is computed pitch synchronously at the end of the frame as follow:

$$E = \max_{i=L-t_E}^{L-1} (s^2(i)) \quad (20)$$

where L is the frame length and signal s(i) stands for speech signal. If the pitch delay is greater than the subframe size (40 samples in this illustrative embodiment), $t_E$ equals the rounded close-loop pitch lag of the last subframe. If the pitch delay is shorter than 40 samples, then $t_E$ is set to twice the rounded closed-loop pitch lag of the last subframe.

For other classes, E is the average energy per sample of the second half of the current frame, i.e. $t_E$ is set to L/2 and the E is computed as:

$$E = \frac{1}{t_E} \sum_{i=L-t_E}^{L-1} s^2(i) \quad (21)$$

In this illustrative embodiment the local synthesis signal at the encoder is used to compute the energy information.

In this illustrative embodiment the energy information is transmitted in Layer 4. Thus if Layer 4 is received, this information can be used to improve the frame erasure concealment. Otherwise the energy is estimated at the decoder side.

Phase Control Information

Phase control is used while recovering after a lost segment of voiced speech for similar reasons as described in the previous section. After a block of erased frames, the decoder memories become desynchronized with the encoder memories. To resynchronize the decoder, some phase information can be transmitted. As a non limitative example, the position and sign of the last glottal pulse in the previous frame can be sent as phase information. This phase information is then used for the recovery after lost voiced onsets as will be described later. Also, as will be disclosed later, this information is also used to resynchronize the excitation signal of erased frames in order to improve the convergence in the correctly received consecutive frames (reduce the propagated error).

The phase information can correspond to either the first glottal pulse in the frame or last glottal pulse in the previous frame. The choice will depend on whether extra delay is available at the decoder or not. In this illustrative embodiment, one frame delay is available at the decoder for the overlap-and-add operation in the MDCT reconstruction. Thus, when a single frame is erased, the parameters of the future frame are available (because of the extra frame delay). In this case the position and sign of the maximum pulse at the end of the erased frame are available from the future frame. Therefore the pitch excitation can be concealed in a way that the last maximum pulse is aligned with the position received in the future frame. This will be disclosed in more details below.

No extra delay may be available at the decoder. In this case the phase information is not used when the erased frame is concealed. However, in the good received frame after the erased frame, the phase information is used to perform the glottal pulse synchronization in the memory of the adaptive codebook. This will improve the performance in reducing error propagation.

Let $T_0$ be the rounded closed-loop pitch lag for the last subframe. The search of the maximum pulse is performed on the low-pass filtered LP residual. The low-pass filtered residual is given by:

$$r_{LP}(n)=0.25r(n-1)+0.5r(n)+0.25r(n+1) \qquad (22)$$

The glottal pulse search and quantization module 707 searches the position of the last glottal pulse $\tau$ among the $T_0$ last samples of the low-pass filtered residual in the frame by looking for the sample with the maximum absolute amplitude ($\tau$ is the position relative to the end of the frame).

The position of the last glottal pulse is coded using 6 bits in the following manner. The precision used to encode the position of the first glottal pulse depends on the closed-loop pitch value for the last subframe $T_0$. This is possible because this value is known both by the encoder and the decoder, and is not subject to error propagation after one or several frame losses. When $T_0$ is less than 64, the position of the last glottal pulse relative to the end of the frame is encoded directly with a precision of one sample. When $64\leqq T_0<128$, the position of the last glottal pulse relative to the end of the frame is encoded with a precision of two samples by using a simple integer division, i.e. $\tau/2$. When $T_0\geqq128$, the position of the last glottal pulse relative to the end of the frame is encoded with a precision of four samples by further dividing $\tau$ by 2. The inverse procedure is done at the decoder. If $T_0<64$, the received quantized position is used as is. If $64\leqq T_0<128$, the received quantized position is multiplied by 2 and incremented by 1. If $T_0\geqq128$, the received quantized position is multiplied by 4 and incremented by 2 (incrementing by 2 results in uniformly distributed quantization error).

The sign of the maximum absolute pulse amplitude is also quantized. This gives a total of 7 bits for the phase information. The sign is used for phase resynchronization since in the glottal pulse shape often contains two large pulses with opposite signs. Ignoring the sign may result in a small drift in the position and reduce the performance of the resynchronization procedure.

It should be noted that efficient methods for quantizing the phase information can be used. For example the last pulse position in the previous frame can be quantized relative to a position estimated from the pitch lag of the first subframe in the present frame (the position can be easily estimated from the first pulse in the frame delayed by the pitch lag).

In the case more bits are available, the shape of the glottal pulse can be encoded. In this case, the position of the first glottal pulse can be determined by a correlation analysis between the residual signal and the possible pulse shapes, signs (positive or negative) and positions. The pulse shape can be taken from a codebook of pulse shapes known at both the encoder and the decoder, this method being known as vector quantization by those of ordinary skill in the art. The shape, sign and amplitude of the first glottal pulse are then encoded and transmitted to the decoder.

Processing of Erased Frames

The FER concealment techniques in this illustrative embodiment are demonstrated on ACELP type codecs. They can be however easily applied to any speech codec where the synthesis signal is generated by filtering an excitation signal through a LP synthesis filter. The concealment strategy can be summarized as a convergence of the signal energy and the spectral envelope to the estimated parameters of the background noise. The periodicity of the signal is converged to zero. The speed of the convergence is dependent on the parameters of the last good received frame class and the number of consecutive erased frames and is controlled by an attenuation factor $\alpha$. The factor $\alpha$ is further dependent on the stability of the LP filter for UNVOICED frames. In general, the convergence is slow if the last good received frame is in a stable segment and is rapid if the frame is in a transition segment. The values of a are summarized in Table 6.

TABLE 6

Values of the FER concealment attenuation factor $\alpha$

| Last Good Received Frame | Number of successive erased frames | $\alpha$ |
|---|---|---|
| VOICED, ONSET, | 1 | $\beta$ |
| ARTIFICIAL ONSET | >1 | $\bar{g}_p$ |
| VOICED TRANSITION | ≦2 | 0.8 |
| | >2 | 0.2 |
| UNVOICED TRANSITION | | 0.88 |
| UNVOICED | =1 | 0.95 |
| | >1 | $0.5\,\theta + 0.4$ |

In Table 6, $\bar{g}_p$ is an average pitch gain per frame given by:

$$\bar{g}_p=0.1g_p^{(0)}+0.2g_p^{(1)}+0.3g_p^{(2)}+0.4g_p^{(3)} \qquad (23)$$

where $g_p^{(i)}$ is the pitch gain in subframe i.

The value of $\beta$ is given by $$\beta=\sqrt{\bar{g}_p} \text{ bounded by } 0.85\leqq\beta\leqq0.98 \qquad (24)$$

The value $\theta$ is a stability factor computed based on a distance measure between the adjacent LP filters. Here, the factor $\theta$ is related to the LSP (Line Spectral Pair) distance measure and it is bounded by $0\leqq\theta\leqq1$, with larger values of corresponding to more stable signals. This results in decreasing energy and spectral envelope fluctuations when an isolated frame erasure occurs inside a stable unvoiced segment. In this illustrative embodiment the stability factor θ is given by:

$$\theta = 1.25 - \frac{1}{1.4}\sum_{i=0}^{9}(LSP_i - LSPold_i)^2 \text{ bounded by } 0 \le \theta \le 1. \quad (25)$$

where $LSP_i$ are the present frame LSPs and $LSPold_i$ are the past frame LSPs. Note that the LSPs are in the cosine domain (from −1 to 1).

In case the classification information of the future frame is not available, the class is set to be the same as in the last good received frame. If the class information is available in the future frame the class of the lost frame is estimated based on the class in the future frame and the class of the last good frame. In this illustrative embodiment, the class of the future frame can be available if Layer 2 of the future frame is received (future frame bit rate above 8 kbit/s and not lost). If the encoder operates at a maximum bit rate of 12 kbit/s then the extra frame delay at the decoder used for MDCT overlap-and-add is not needed and the implementer can choose to lower the decoder delay. In this case concealment will be performed only on past information. This will be referred to as low-delay decoder mode.

Let the $class_{old}$ denote the class of the last good frame, and $class_{new}$ denote the class of the future frame and $class_{lost}$ is the class of the lost frame to be estimated.

Initially, $class_{lost}$ is set equal to $class_{old}$. If the future frame is available then its class information is decoded into $class_{new}$. Then the value of $class_{lost}$ is updated as follows:

If $class_{new}$ is VOICED and $class_{old}$ is ONSET then $class_{lost}$ is set to VOICED.

If $class_{new}$ is VOICED and the class of the frame before the last good frame is ONSET or VOICED then $class_{lost}$ is set to VOICED.

If $class_{new}$ is UNVOICED and $class_{old}$ is VOICED then $class_{lost}$ is set to UNVOICED TRANSITION.

If $class_{new}$ is VOICED or ONSET and $class_{old}$ is UNVOICED then $class_{lost}$ is set to SIN ONSET (onset reconstruction).

Construction of the Periodic Part of the Excitation

For a concealment of erased frames whose class is set to UNVOICED or UNVOICED TRANSITION, no periodic part of the excitation signal is generated. For other classes, the periodic part of the excitation signal is constructed in the following manner.

First, the last pitch cycle of the previous frame is repeatedly copied. If it is the case of the 1$^{st}$ erased frame after a good frame, this pitch cycle is first low-pass filtered. The filter used is a simple 3-tap linear phase FIR (Finite Impulse Response) filter with filter coefficients equal to 0.18, 0.64 and 0.18.

The pitch period $T_c$ used to select the last pitch cycle and hence used during the concealment is defined so that pitch multiples or submultiples can be avoided, or reduced. The following logic is used in determining the pitch period $T_c$.

if (($T_3$<1.8 $T_s$) AND ($T_3$>0.6 $T_s$)) OR ($T_{cnt}$≧30), then $T_c$=$T_3$, else $T_c$=$T_s$.

Here, $T_3$ is the rounded pitch period of the 4$^{th}$ subframe of the last good received frame and $T_s$ is the rounded predicted pitch period of the 4$^{th}$ subframe of the last good stable voiced frame with coherent pitch estimates. A stable voiced frame is defined here as a VOICED frame preceded by a frame of voiced type (VOICED TRANSITION, VOICED, ONSET). The coherence of pitch is verified in this implementation by examining whether the closed-loop pitch estimates are reasonably close, i.e. whether the ratios between the last subframe pitch, the 2nd subframe pitch and the last subframe pitch of the previous frame are within the interval (0.7, 1.4). Alternatively, if there are multiple frames lost, $T_3$ is the rounded estimated pitch period of the 4$^{th}$ subframe of the last concealed frame.

This determination of the pitch period $T_c$ means that if the pitch at the end of the last good frame and the pitch of the last stable frame are close to each other, the pitch of the last good frame is used. Otherwise this pitch is considered unreliable and the pitch of the last stable frame is used instead to avoid the impact of wrong pitch estimates at voiced onsets. This logic makes however sense only if the last stable segment is not too far in the past. Hence a counter $T_{cnt}$ is defined that limits the reach of the influence of the last stable segment. If $T_{cnt}$ is greater or equal to 30, i.e. if there are at least 30 frames since the last $T_s$ update, the last good frame pitch is used systematically. $T_{cnt}$ is reset to 0 every time a stable segment is detected and $T_s$ is updated. The period $T_c$ is then maintained constant during the concealment for the whole erased block.

For erased frames following a correctly received frame other than UNVOICED, the excitation buffer is updated with this periodic part of the excitation only. This update will be used to construct the pitch codebook excitation in the next frame.

The procedure described above may result in a drift in the glottal pulse position, since the pitch period used to build the excitation can be different from the true pitch period at the encoder. This will cause the adaptive codebook buffer (or past excitation buffer) to be desynchronized from the actual excitation buffer. Thus, in case a good frame is received after the erased frame, the pitch excitation (or adaptive codebook excitation) will have an error which may persist for several frames and affect the performance of the correctly received frames.

Figure 9:
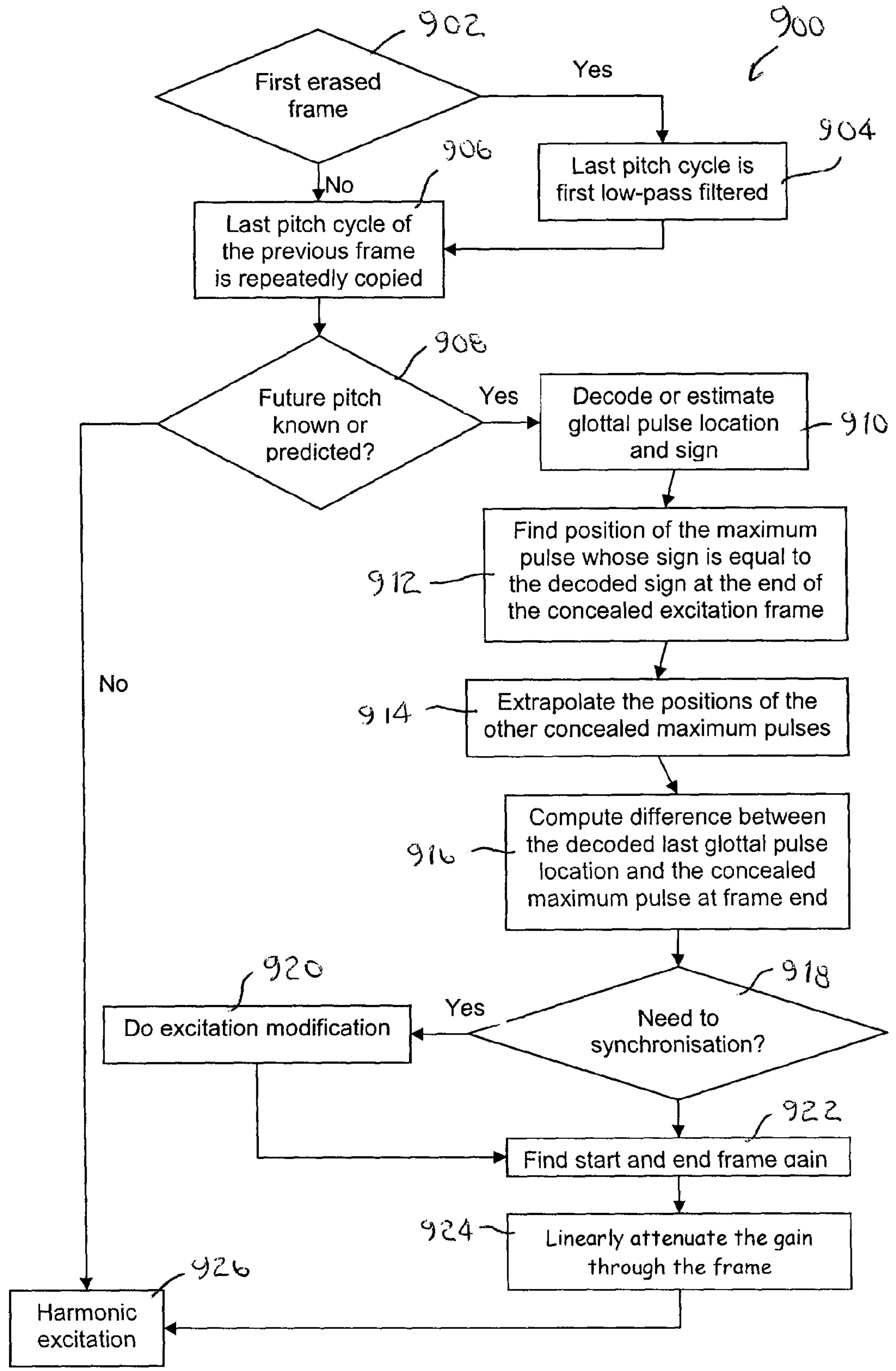
FIG. 9 is a flow chart showing a concealment procedure of the periodic part of the excitation according to the non-restrictive illustrative embodiment of the present invention.
Figure 10:
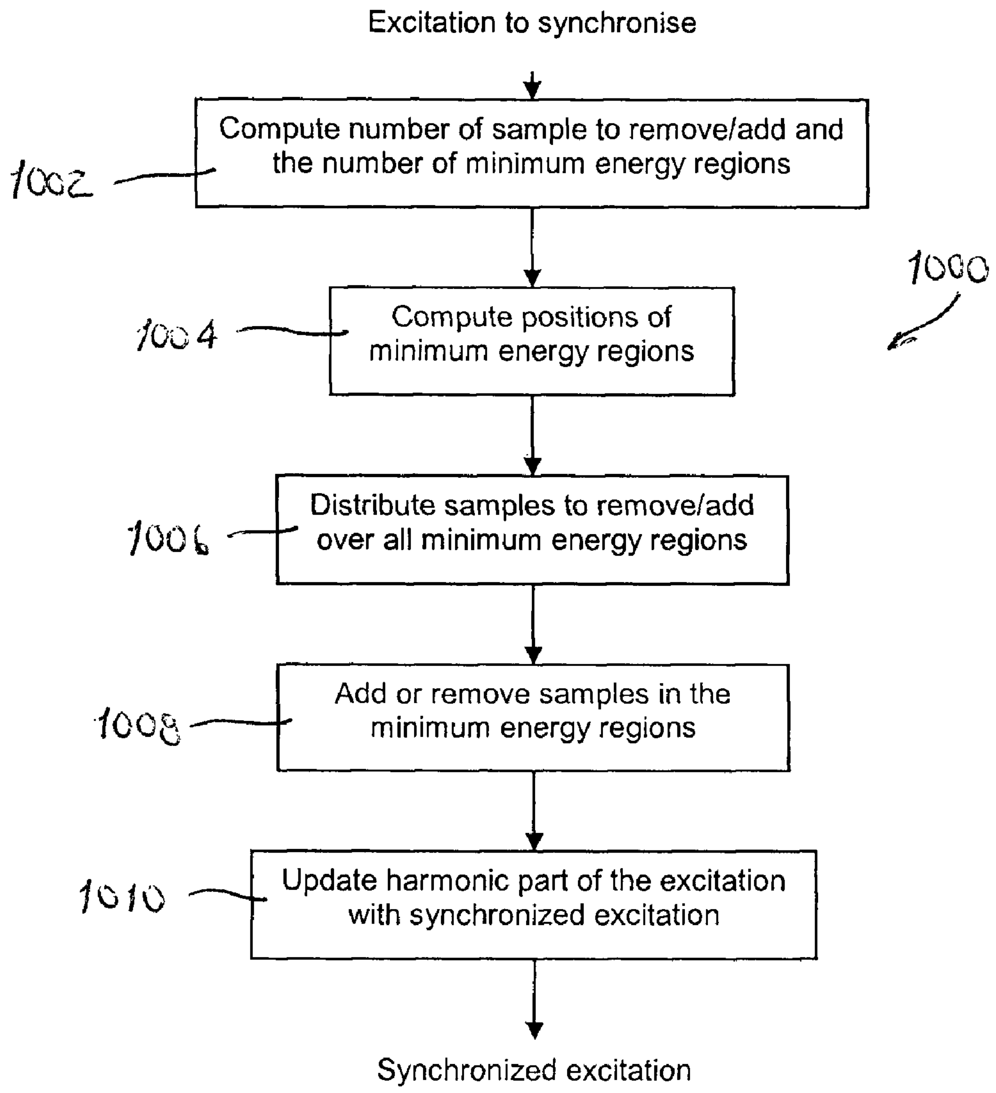
FIG. 10 is a flow chart showing a synchronization procedure of the periodic part of the excitation according to the non-restrictive illustrative embodiment of the present invention.

FIG. 9 is a flow chart showing the concealment procedure 900 of the periodic part of the excitation described in the illustrative embodiment, and FIG. 10 is a flow chart showing the synchronization procedure 1000 of the periodic part of the excitation.

To overcome this problem and improve the convergence at the decoder, a resynchronization method (900 in FIG. 9) is disclosed which adjusts the position of the last glottal pulse in the concealed frame to be synchronized with the actual glottal pulse position. In a first implementation, this resynchronization procedure may be performed based on a phase information regarding the true position of the last glottal pulse in the concealed frame which is transmitted in the future frame. In a second implementation, the position of the last glottal pulse is estimated at the decoder when the information from future frame is not available.

As described above, the pitch excitation of the entire lost frame is built by repeating the last pitch cycle $T_c$ of the previous frame (operation 906 in FIG. 9), where $T_c$ is defined above. For the first erased frame (detected during operation 902 in FIG. 9) the pitch cycle is first low pass filtered (operation 904 in FIG. 9) using a filter with coefficients 0.18, 0.64, and 0.18. This is done as follows:

$$u(n)=0.18u(n-T_c-1)+0.64u(n-T_c)+0.18u(n-T_c+1),\quad n=0,\ldots,T_c-1$$

$$u(n)=u(n-T_c),\ n=T_c,\ldots,L+N-1 \quad (26)$$

where u(n) is the excitation signal, L is the frame size, and N is the subframe size. If this is not the first erased frame, the concealed excitation is simply built as:

$$u(n)=u(n-T_c), n=0, \ldots, L+N-1 \quad (27)$$

It should be noted that the concealed excitation is also computed for an extra subframe to help in the resynchronization as will be shown below.

Once the concealed excitation is found, the resynchronization procedure is performed as follows. If the future frame is available (operation 908 in FIG. 9) and contains the glottal pulse information, then this information is decoded (operation 910 in FIG. 9). As described above, this information consists of the position of the absolute maximum pulse from the end of the frame and its sign. Let this decoded position be denoted $P_0$ then the actual position of the absolute maximum pulse is given by:

$$P_{last}=L-P_0$$

Then the position of the maximum pulse in the concealed excitation from the beginning of the frame with a sign similar to the decoded sign information is determined based on a low past filtered excitation (operation 912 in FIG. 9). That is, if the decoded maximum pulse position is positive then a maximum positive pulse in the concealed excitation from the beginning of the frame is determined, otherwise the negative maximum pulse is determined. Let the first maximum pulse in the concealed excitation be denoted T(0). The positions of the other maximum pulses are given by (operation 914 in FIG. 9):

$$T(i)=T(0)+iT_c, i=1, \ldots, N_p-1 \quad (28)$$

where $N_p$ is the number of pulses (including the first pulse in the future frame).

The error in the pulse position of the last concealed pulse in the frame is found (operation 916 in FIG. 9) by searching for the pulse T(i) closest to the actual pulse $P_{last}$. If the error is given by:

$T_e=P_{last}-T(k)$, where $k$ is the index of the pulse closest to $P_{last}$.

If $T_e=0$, then no resynchronization is required (operation 918 in FIG. 9). If the value of $T_e$ is positive ($T(k)<P_{last}$) then $T_e$ samples need to be inserted (operation 1002 in FIG. 10). If $T_e$ is negative ($T(k)>P_{last}$) then $T_e$ samples need to be removed ((operation 1002 in FIG. 10). Further, the resynchronization is performed only if $T_e<N$ and $T_e<N_p \times T_{diff}$, where N is the subframe size and $T_{diff}$ is the absolute difference between $T_c$ and the pitch lag of the first subframe in the future frame (operation 918 in FIG. 9).

The samples that need to be added or deleted are distributed across the pitch cycles in the frame. The minimum energy regions in the different pitch cycles are determined and the sample deletion or insertion is performed in those regions. The number of pitch pulses in the frame is $N_p$ at respective positions T(i), i=0, . . . , $N_p-1$. The number of minimum energy regions is $N_p-1$. The minimum energy regions are determined by computing the energy using a sliding 5-sample window (operation 1002 in FIG. 10). The minimum energy position is set at the middle of the window at which the energy is at minimum (operation 1004 in FIG. 10). The search performed between two pitch pulses at position T(i) and T(i+1) is restricted between $T(i)+T_c/4$ and $T(i+1)-T_c/4$.

Let the minimum positions determined as described above be denoted as $T_{min}(i)$, i=0, . . . , $N_{min}-1$, where $N_{min}=N_p-1$ is the number of minimum energy regions. The sample deletion or insertion is performed around $T_{min}(i)$. The samples to be added or deleted are distributed across the different pitch cycles as will be disclosed as follows.

If $N_{min}=1$, then there is only one minimum energy region and all pulses $T_e$ are inserted or deleted at $T_{min}(0)$.

For $N_{min}>1$, a simple algorithm is used to determine the number of samples to be added or removed at each pitch cycle whereby less samples are added/removed at the beginning and more towards the end of the frame (operation 1006 in FIG. 10). In this illustrative embodiment, for the values of total number of pulses to be removed/added $T_e$ and number of minimum energy regions $N_{min}$, the number of samples to be removed/added per pitch cycle, R(i), i=0, . . . , $N_{min}-1$, is found using the following recursive relation (operation 1006 in FIG. 10):

$$R(i) = \text{round}\left(\frac{(i+1)^2}{2} f - \sum_{k=0}^{i-1} R(k)\right) \quad (29)$$

$$\text{where } f = \frac{2|T_e|}{N_{min}^2}$$

It should be noted that, at each stage, the condition R(i)<R(i−1) is checked and if it is true, then the values of R(i) and R(i−1) are interchanged.

The values R(i) correspond to pitch cycles starting from the beginning of the frame. R(0) correspond to $T_{min}(0)$, R(1) correspond to $T_{min}(1)$, . . . , $R(N_{min}-1)$ correspond to $T_{min}(N_{min}-1)$. Since the values R(i) are in increasing order, then more samples are added/removed towards the cycles at the end of the frame.

As an example for the computation of R(i), for $T_e$=11 or −11 $N_{min}$=4 (11 samples to be added/removed and 4 pitch cycles in the frame), the following values of R(i) are found:

$$f=2\times11/16=1.375$$

$$R(0)=\text{round}(f/2)=1$$

$$R(1)=\text{round}(2f-1)=2$$

$$R(2)=\text{round}(4.5f-1-2)=3$$

$$R(3)=\text{round}(8f-1-2-3)=5$$

Thus, 1 sample is added/removed around minimum energy position $T_{min}(0)$, 2 samples are added/removed around minimum energy position $T_{min}(1)$, 3 samples are added/removed around minimum energy position $T_{min}(2)$, and 5 samples are added/removed around minimum energy position $T_{min}(3)$ (operation 1008 in FIG. 10).

Removing samples is straightforward. Adding samples (operation 1008 in FIG. 10) is performed in this illustrative embodiment by copying the last R(i) samples after dividing by 20 and inverting the sign. In the above example where 5 samples need to be inserted at position $T_{min}(3)$ the following is performed:

$$u(T_{min}(3)+i)=-u(T_{min}(3)+i-R(3))/20, i=0, \ldots, 4 \quad (30)$$

Using the procedure disclosed above, the last maximum pulse in the concealed excitation is forced to align to the actual maximum pulse position at the end of the frame which is transmitted in the future frame (operation 920 in FIG. 9 and operation 1010 in FIG. 10).

If the pulse phase information is not available but the future frame is available, the pitch value of the future frame can be interpolated with the past pitch value to find estimated pitch lags per subframe. If the future frame is not available, the pitch value of the missing frame can be estimated then interpolated with the past pitch value to find the estimated pitch lags per subframe. Then total delay of all pitch cycles in the concealed frame is computed for both the last pitch used in concealment and the estimated pitch lags per subframe. The difference between these two total delays gives an estimation of the difference between the last concealed maximum pulse in the frame and the estimated pulse. The pulses can then be resynchronized as described above (operation 920 in FIG. 9 and operation 1010 in FIG. 10).

If the decoder has no extra delay, the pulse phase information present in the future frame can be used in the first received good frame to resynchronize the memory of the adaptive codebook (the past excitation) and get the last maximum glottal pulse aligned with the position transmitted in the current frame prior to constructing the excitation of the current frame. In this case, the synchronization will be done exactly as described above, but in the memory of the excitation instead of being done in the current excitation. In this case the construction of the current excitation will start with a synchronized memory.

When no extra delay is available, it is also possible to send the position of the first maximum pulse of the current frame instead of the position of the last maximum glottal pulse of the last frame. If this is the case, the synchronization is also achieved in the memory of the excitation prior to constructing the current excitation. With this configuration, the actual position of the absolute maximum pulse in the memory of the excitation is given by:

$$P_{last}=L+P_o-T_{new}$$

where $T_{new}$ is the first pitch cycle of the new frame and $P_o$ is the decoded position of the first maximum glottal pulse of the current frame.

As the last pulse of the excitation of the previous frame is used for the construction of the periodic part, its gain is approximately correct at the beginning of the concealed frame and can be set to 1 (operation 922 in FIG. 9). The gain is then attenuated linearly throughout the frame on a sample by sample basis to achieve the value of a at the end of the frame (operation 924 in FIG. 9).

The values of α (operation 922 in FIG. 9) correspond to the values of Table 6 which take into consideration the energy evolution of voiced segments. This evolution can be extrapolated to some extend by using the pitch excitation gain values of each subframe of the last good frame. In general, if these gains are greater than 1, the signal energy is increasing, if they are lower than 1, the energy is decreasing. α is thus set to $\beta=\sqrt{\bar{g}_p}$ as described above. The value of β is clipped between 0.98 and 0.85 to avoid strong energy increases and decreases.

For erased frames following a correctly received frame other than UNVOICED, the excitation buffer is updated with the periodic part of the excitation only (after resynchronization and gain scaling). This update will be used to construct the pitch codebook excitation in the next frame (operation 926 in FIG. 9).

Figure 11:
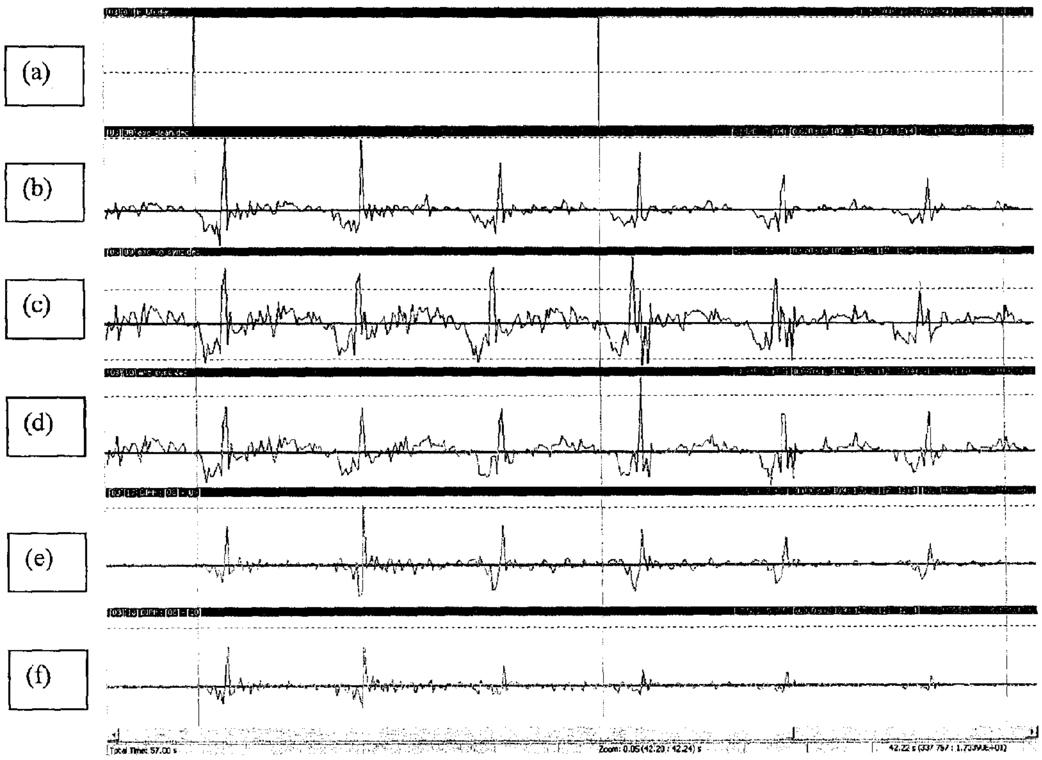
FIG. 11 shows typical examples of the excitation signal with and without the synchronization procedure.

FIG. 11 shows typical examples of the excitation signal with and without the synchronization procedure. The original excitation signal without frame erasure is shown in FIG. 11*b*. FIG. 11*c* shows the concealed excitation signal when the frame shown in FIG. 11*a* is erased, without using the synchronization procedure. It can be clearly seen that the last glottal pulse in the concealed frame is not aligned with the true pulse position shown in FIG. 11*b*. Further, it can be seen that the effect of frame erasure concealment persists in the following frames which are not erased. FIG. 11*d* shows the concealed excitation signal when the synchronization procedure according to the above described illustrative embodiment of the invention has be used. It can be clearly seen that the last glottal pulse in the concealed frame is properly aligned with the true pulse position shown in FIG. 11*b*. Further, it can be seen that the effect of the frame erasure concealment on the following properly received frames is less problematic than the case of FIG. 11*c*. This observation is confirmed in FIGS. 11*e* and 11*f*. FIG. 11*e* shows the error between the original excitation and the concealed excitation without synchronization. FIG. 114 shows the error between the original excitation and the concealed excitation when the synchronization procedure is used.

Figure 12:
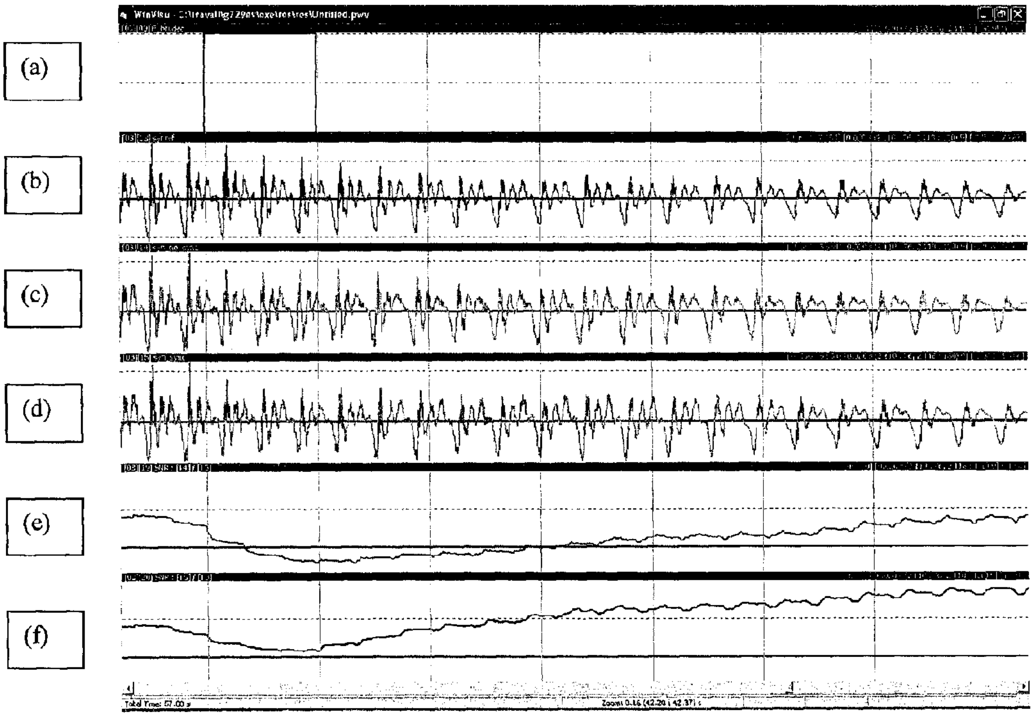
FIG. 12 shows examples of the reconstructed speech signal using the excitation signals shown in FIG. 11.

FIG. 12 shows examples of the reconstructed speech signal using the excitation signals shown in FIG. 11. The reconstructed signal without frame erasure is shown in FIG. 12*b*. FIG. 12*c* shows the reconstructed speech signal when the frame shown in FIG. 12*a* is erased, without using the synchronization procedure. FIG. 12*d* shows the reconstructed speech signal when the frame shown in FIG. 12*a* is erased, with the use of the synchronization procedure as disclosed in the above illustrative embodiment of the present invention. FIG. 12*e* shows the signal-to-noise ratio (SNR) per subframe between the original signal and the signal in FIG. 12*c*. It can be seen from FIG. 12*e* that the SNR stays very low even when good frames are received (it stays below 0 dB for the next two good frames and stays below 8 dB until the $7^{th}$ good frame). FIG. 12*f* shows the signal-to-noise ratio (SNR) per subframe between the original signal and the signal in FIG. 12*d*. It can be seen from FIG. 12*d* that signal quickly converges to the true reconstructed signal. The SNR quickly rises above 10 dB after two good frames.

Construction of the Random Part of the Excitation

The innovation (non-periodic) part of the excitation signal is generated randomly. It can be generated as a random noise or by using the CELP innovation codebook with vector indexes generated randomly. In the present illustrative embodiment, a simple random generator with approximately uniform distribution has been used. Before adjusting the innovation gain, the randomly generated innovation is scaled to some reference value, fixed here to the unitary energy per sample.

At the beginning of an erased block, the innovation gain $g_s$ is initialized by using the innovation excitation gains of each subframe of the last good frame:

$$g_s=0.1g(0)+0.2g(1)+0.3g(2)+0.4g(3) \qquad (31)$$

where g(0), g(1), g(2) and g(3) are the fixed codebook, or innovation, gains of the four (4) subframes of the last correctly received frame. The attenuation strategy of the random part of the excitation is somewhat different from the attenuation of the pitch excitation. The reason is that the pitch excitation (and thus the excitation periodicity) is converging to 0 while the random excitation is converging to the comfort noise generation (CNG) excitation energy. The innovation gain attenuation is done as:

$$g_s^1=\alpha\cdot g_s^0+(1-\alpha)\cdot g_n \qquad (32)$$

where $g_s^1$ is the innovation gain at the beginning of the next frame, $g_s^0$ is the innovation gain at the beginning of the current frame, $g_n$ is the gain of the excitation used during the comfort noise generation and a is as defined in Table 5. Similarly to the periodic excitation attenuation, the gain is thus attenuated linearly throughout the frame on a sample by sample basis starting with $g_s^0$ and going to the value of $g_s^1$ that would be achieved at the beginning of the next frame.

Finally, if the last good (correctly received or non erased) received frame is different from UNVOICED, the innovation excitation is filtered through a linear phase FIR high-pass filter with coefficients −0.0125, −0.109, 0.7813, −0.109, −0.0125. To decrease the amount of noisy components during voiced segments, these filter coefficients are multiplied by an adaptive factor equal to (0.75-0.25 $r_v$), $r_v$ being a voicing factor in the range −1 to 1. The random part of the excitation is then added to the adaptive excitation to form the total excitation signal.

If the last good frame is UNVOICED, only the innovation excitation is used and it is further attenuated by a factor of 0.8. In this case, the past excitation buffer is updated with the innovation excitation as no periodic part of the excitation is available.

Spectral Envelope Concealment, Synthesis and Updates

To synthesize the decoded speech, the LP filter parameters must be obtained.

In case the future frame is not available, the spectral envelope is gradually moved to the estimated envelope of the ambient noise. Here the LSF representation of the LP parameters is used:

$$I^1(j)=\alpha I^0(j)+(1-\alpha)I_n(j), j=0, \ldots, p-1 \quad (33)$$

In equation (33), $I^1(j)$ is the value of the $j^{th}$ LSF of the current frame, $I^0(j)$ is the value of the $j^{th}$ LSF of the previous frame, $I^n(j)$ is the value of the $j^{th}$ LSF of the estimated comfort noise envelope and p is the order of the LP filter (note that LSFs are in the frequency domain). Alternatively, the LSF parameters of the erased frame can be simply set equal to the parameters from the last frame ($I^1(j)=I^0(j)$).

The synthesized speech is obtained by filtering the excitation signal through the LP synthesis filter. The filter coefficients are computed from the LSF representation and are interpolated for each subframe (four (4) times per frame) as during normal encoder operation.

In case the future frame is available the LP filter parameters per subframe are obtained by interpolating the LSP values in the future and previous frames. Several methods can be used for finding the interpolated parameters. In one method the LSP parameters for the whole frame are found using the relation:

$$LSP^{(1)}=0.4\ LSP^{(0)}+0.6\ LSF^{(2)} \quad (34)$$

where $LSP^{(1)}$ are the estimated LSPs of the erased frame, $LSP^{(0)}$ are the LSPs in the past frame and $LSP^{(2)}$ are the LSPs in the future frame.

As a non limitative example, the LSP parameters are transmitted twice per 20-ms frame (centred at the second and fourth subframes). Thus $LSP^{(0)}$ is centered at the fourth subframe of the past frame and $LSP^{(2)}$ is centred at the second subframe of the future frame. Thus interpolated LSP parameters can be found for each subframe in the erased frame as:

$$LSP^{(1,i)}=((5-i)LSP^{(0)}+(i+1)\ LSF^{(2)})/6, i=0, \ldots, 3, \quad (35)$$

where i is the subframe index. The LSPs are in the cosine domain (−1 to 1).

As the innovation gain quantizer and LSF quantizer both use a prediction, their memory will not be up to date after the normal operation is resumed. To reduce this effect, the quantizers' memories are estimated and updated at the end of each erased frame.

Recovery of the Normal Operation after Erasure

The problem of the recovery after an erased block of frames is basically due to the strong prediction used practically in all modern speech encoders. In particular, the CELP type speech coders achieve their high signal-to-noise ratio for voiced speech due to the fact that they are using the past excitation signal to encode the present frame excitation (long-term or pitch prediction). Also, most of the quantizers (LP quantizers, gain quantizers, etc.) make use of a prediction.

Artificial Onset Construction

The most complicated situation related to the use of the long-term prediction in CELP encoders is when a voiced onset is lost. The lost onset means that the voiced speech onset happened somewhere during the erased block. In this case, the last good received frame was unvoiced and thus no periodic excitation is found in the excitation buffer. The first good frame after the erased block is however voiced, the excitation buffer at the encoder is highly periodic and the adaptive excitation has been encoded using this periodic past excitation. As this periodic part of the excitation is completely missing at the decoder, it can take up to several frames to recover from this loss.

Figure 13:
FIG. 13 is a block diagram illustrating a case example when an onset frame is lost.

If an ONSET frame is lost (i.e. a VOICED good frame arrives after an erasure, but the last good frame before the erasure was UNVOICED as shown in FIG. 13, a special technique is used to artificially reconstruct the lost onset and to trigger the voice synthesis. In this illustrative embodiment, the position of the last glottal pulse in the concealed frame can be available from the future frame (future frame is not lost and phase information related to previous frame received in the future frame). In this case, the concealment of the erased frame is performed as usual. However, the last glottal pulse of the erased frame is artificially reconstructed based on the position and sign information available from the future frame. This information consists of the position of the maximum pulse from the end of the frame and its sign. The last glottal pulse in the erased frame is thus constructed artificially as a low-pass filtered pulse. In this illustrative embodiment, if the pulse sign is positive, the low-pass filter used is a simple linear phase FIR filter with the impulse response $h_{low}$={−0.0125, 0.109, 0.7813, 0.109, −0.0125}. If the pulse sign is negative, the low-pass filter used is a linear phase FIR filter with the impulse response $h_{low}$={0.0125, −0.109, −0.7813, −0.109, 0.0125}.

The pitch period considered is the last subframe of the concealed frame. The low-pass filtered pulse is realized by placing the impulse response of the low-pass filter in the memory of the adaptive excitation buffer (previously initialized to zero). The low-pass filtered glottal pulse (impulse response of low pass filter) will be centered at the decoded position $P_{last}$ (transmitted within the bitstream of the future frame). In the decoding of the next good frame, normal CELP decoding is resumed. Placing the low-pass filtered glottal pulse at the proper position at the end of the concealed frame significantly improves the performance of the consecutive good frames and accelerates the decoder convergence to actual decoder states.

The energy of the periodic part of the artificial onset excitation is then scaled by the gain corresponding to the quantized and transmitted energy for FER concealment and divided by the gain of the LP synthesis filter. The LP synthesis filter gain is computed as:

$$g_{LP}=\sqrt{\sum_{i=0}^{40} h^2(i)} \quad (36)$$

where h(i) is the LP synthesis filter impulse response. Finally, the artificial onset gain is reduced by multiplying the periodic part by 0.96.

The LP filter for the output speech synthesis is not interpolated in the case of an artificial onset construction. Instead, the received LP parameters are used for the synthesis of the whole frame.

Energy Control

One task at the recovery after an erased block of frames is to properly control the energy of the synthesized speech signal. The synthesis energy control is needed because of the strong prediction usually used in modern speech coders. Energy control is also performed when a block of erased frames happens during a voiced segment. When a frame erasure arrives after a voiced frame, the excitation of the last good frame is typically used during the concealment with some attenuation strategy. When a new LP filter arrives with the first good frame after the erasure, there can be a mismatch between the excitation energy and the gain of the new LP synthesis filter. The new synthesis filter can produce a synthesis signal with an energy highly different from the energy of the last synthesized erased frame and also from the original signal energy.

The energy control during the first good frame after an erased frame can be summarized as follows. The synthesized signal is scaled so that its energy is similar to the energy of the synthesized speech signal at the end of the last erased frame at the beginning of the first good frame and is converging to the transmitted energy towards the end of the frame for preventing too high an energy increase.

The energy control is done in the synthesized speech signal domain. Even if the energy is controlled in the speech domain, the excitation signal must be scaled as it serves as long term prediction memory for the following frames. The synthesis is then redone to smooth the transitions. Let $g_0$ denote the gain used to scale the $1^{st}$ sample in the current frame and $g_1$ the gain used at the end of the frame. The excitation signal is then scaled as follows:

$$u_s(i)=g_{AGC}(i)\cdot u(i), i=0, \ldots, L-1 \quad (37)$$

where $u_s(i)$ is the scaled excitation, u(i) is the excitation before the scaling, L is the frame length and $g_{AGC}(i)$ is the gain starting from $g_0$ and converging exponentially to $g_1$:

$$g_{AGC}(i)=f_{AGC}g_{AGC}(i-1)+(1-f_{AGC})g_1 \; i=0, \ldots, L-1 \quad (38)$$

with the initialization of $g_{AGC}(-1)=g_0$, where $f_{AGC}$ is the attenuation factor set in this implementation to the value of 0.98. This value has been found experimentally as a compromise of having a smooth transition from the previous (erased) frame on one side, and scaling the last pitch period of the current frame as much as possible to the correct (transmitted) value on the other side. This is made because the transmitted energy value is estimated pitch synchronously at the end of the frame. The gains $g_0$ and $g_1$ are defined as:

$$g_0=\sqrt{E_{-1}/E_0} \quad (39)$$

$$g_1=\sqrt{E_q/R_1} \quad (40)$$

where $E_{-1}$ is the energy computed at the end of the previous (erased) frame, $E_0$ is the energy at the beginning of the current (recovered) frame, $E_1$ is the energy at the end of the current frame and $E_q$ is the quantized transmitted energy information at the end of the current frame, computed at the encoder from Equations (20; 21). $E_{-1}$ and $E_1$ are computed similarly with the exception that they are computed on the synthesized speech signal s'. $E_{-1}$ is computed pitch synchronously using the concealment pitch period $T_c$ and $E_1$ uses the last subframe rounded pitch $T_3$. $E_0$ is computed similarly using the rounded pitch value $T_0$ of the first subframe, the equations (20; 21) being modified to:

$$E=\max_{i=0}^{t_E}(s'^2(i))$$

for VOICED and ONSET frames. $t_E$ equals to the rounded pitch lag or twice that length if the pitch is shorter than 64 samples. For other frames, $$E=\frac{1}{t_E}\sum_{i=0}^{t_E} s'^2(i)$$

with $t_E$ equal to the half of the frame length. The gains $g_0$ and $g_1$ are further limited to a maximum allowed value, to prevent strong energy. This value has been set to 1.2 in the present illustrative implementation.

Conducting frame erasure concealment and decoder recovery comprises, when a gain of a LP filter of a first non erased frame received following frame erasure is higher than a gain of a LP filter of a last frame erased during said frame erasure, adjusting the energy of an LP filter excitation signal produced in the decoder during the received first non erased frame to a gain of the LP filter of said received first non erased frame using the following relation:

If $E_q$ cannot be transmitted, $E_q$ is set to $E_1$. If however the erasure happens during a voiced speech segment (i.e. the last good frame before the erasure and the first good frame after the erasure are classified as VOICED TRANSITION, VOICED or ONSET), further precautions must be taken because of the possible mismatch between the excitation signal energy and the LP filter gain, mentioned previously. A particularly dangerous situation arises when the gain of the LP filter of a first non erased frame received following frame erasure is higher than the gain of the LP filter of a last frame erased during that frame erasure. In that particular case, the energy of the LP filter excitation signal produced in the decoder during the received first non erased frame is adjusted to a gain of the LP filter of the received first non erased frame using the following relation:

$$E_q=E_1\frac{E_{LP0}}{E_{LP1}}$$

where $E_{LPO}$ is the energy of the LP filter impulse response of the last good frame before the erasure and $E_{LP1}$ is the energy of the LP filter of the first good frame after the erasure. In this implementation, the LP filters of the last subframes in a frame are used. Finally, the value of $E_q$ is limited to the value of $E_{-1}$ in this case (voiced segment erasure without $E_q$ information being transmitted).

The following exceptions, all related to transitions in speech signal, further overwrite the computation of $g_0$. If artificial onset is used in the current frame, $g_0$ is set to 0.5 $g_1$, to make the onset energy increase gradually.

In the case of a first good frame after an erasure classified as ONSET, the gain $g_0$ is prevented to be higher that $g_1$. This precaution is taken to prevent a positive gain adjustment at the beginning of the frame (which is probably still at least partially unvoiced) from amplifying the voiced onset (at the end of the frame).

Finally, during a transition from voiced to unvoiced (i.e. that last good frame being classified as VOICED TRANSITION, VOICED or ONSET and the current frame being classified UNVOICED) or during a transition from a non-active speech period to active speech period (last received good frame being encoded as comfort noise and current frame being encoded as active speech), the $g_0$ is set to $g_1$.

In case of a voiced segment erasure, the wrong energy problem can manifest itself also in frames following the first good frame after the erasure. This can happen even if the first good frame's energy has been adjusted as described above. To attenuate this problem, the energy control can be continued up to the end of the voiced segment.

Application of the Disclosed Concealment in an Embedded Codec with a Wideband Core Layer As mentioned above, the above disclosed illustrative embodiment of the present invention has also been used in a candidate algorithm for the standardization of an embedded variable bit rate codec by ITU-T. In the candidate algorithm, the core layer is based on a wideband coding technique similar to AMR-WB (ITU-T Recommendation G.722.2). The core layer operates at 8 kbit/s and encodes a bandwidth up to 6400 Hz with an internal sampling frequency of 12.8 kHz (similar to AMR-WB). A second 4 kbit/s CELP layer is used increasing the bit rate up to 12 kbit/s. Then MDCT is used to obtain the upper layers from 16 to 32 kbit/s.

The concealment is similar to the method disclosed above with few differences mainly due to the different sampling rate of the core layer. The frame size 256 samples at a 12.8 kHz sampling rate and the subframe size is 64 samples.

The phase information is encoded with 8 bits where the sign is encoded with 1 bit and the position is encoded with 7 bits as follows.

The precision used to encode the position of the first glottal pulse depends on the closed-loop pitch value $T_0$ for the first subframe in the future frame. When $T_0$ is less than 128, the position of the last glottal pulse relative to the end of the frame is encoded directly with a precision of one sample. When $T_0 \geqq 128$, the position of the last glottal pulse relative to the end of the frame is encoded with a precision of two samples by using a simple integer division, i.e. $\tau/2$. The inverse procedure is done at the decoder. If $T_0<128$, the received quantized position is used as is. If $T_0 \geqq 128$, the received quantized position is multiplied by 2 and incremented by 1.

The concealment recovery parameters consist of the 8-bit phase information, 2-bit classification information, and 6-bit energy information. These parameters are transmitted in the third layer at 16 kbit/s.

Although the present invention has been described in the foregoing description in relation to a non restrictive illustrative embodiment thereof, this embodiment can be modified as will, within the scope of the appended claims without departing from the scope and spirit of the subject invention.

REFERENCES

[1] Milan Jelinek and Philippe Gournay. PCT patent application WO03102921A1, "A method and device for efficient frame erasure concealment in linear predictive based speech codecs".

What is claimed is:

1. A method for concealing frame erasures caused by frames of an encoded sound signal erased during transmission from an encoder to a decoder and for recovery of the decoder after frame erasures, the method comprising, in the decoder:

receiving from the encoder concealment/recovery parameters including at least phase information related to frames of the encoded sound signal, wherein the phase information comprises a position of a glottal pulse in each frame of the encoded sound signal;

conducting frame erasure concealment in response to the received concealment/recovery parameters, wherein:

the frame erasure concealment comprises resynchronizing, in response to the received phase information, the erasure-concealed frames with corresponding frames of the encoded sound signal; and resynchronizing an erasure-concealed frame with a corresponding frame of the encoded sound signal comprises:

determining, in the erasure-concealed frame, a position of a maximum amplitude pulse; and aligning the position of the maximum amplitude pulse in the erasure-concealed frame with the position of the glottal pulse of the corresponding frame of the encoded sound signal.

2. A method as defined in claim 1, further comprising:

determining the concealment/recovery parameters in the encoder; and transmitting to the decoder the concealment/recovery parameters determined in the encoder and received by the decoder.

3. A method as defined in claim 1, wherein the phase information comprises a position and sign of a last glottal pulse in each frame of the encoded sound signal.

4. A method as defined in claim 2, further comprising quantizing the position of the glottal pulse prior to transmitting the position of the glottal pulse to the decoder.

5. A method as defined in claim 2, wherein determination of the concealment/recovery parameters comprises determining as the phase information a position and sign of a last glottal pulse in each frame of the encoded sound signal, the method further comprising quantizing the position and sign of the last glottal pulse prior to transmitting the position and sign of the last glottal pulse to the decoder.

6. A method as defined in claim 4, further comprising encoding the quantized position of the glottal pulse into a future frame of the encoded sound signal.

7. A method as defined in claim 2, wherein determining the position of the glottal pulse comprises:

measuring the glottal pulse as a pulse of maximum amplitude in a predetermined pitch cycle of each frame of the encoded sound signal; and determining the position of the pulse of maximum amplitude in the frame of the encoded sound signal.

8. A method as defined in 7, further comprising determining as phase information a sign of the glottal pulse by measuring a sign of the maximum amplitude pulse in the frame of the encoded sound signal.

9. A method as defined in claim 2, wherein determination of the concealment/recovery parameters comprises determining as the phase information a position and sign of a last glottal pulse in each frame of the encoded sound signal and wherein determining the position of the last glottal pulse comprises:

measuring the last glottal pulse as a pulse of maximum amplitude in each frame of the encoded sound signal; and determining the position of the pulse of maximum amplitude in the frame of the encoded sound signal.

10. A method as defined in claim 9, wherein determining the sign of the last glottal pulse comprises:

measuring a sign of the maximum amplitude pulse in the frame of the encoded sound signal.

11. A method as defined in claim 1, wherein
the maximum amplitude pulse in the erasure-concealed frame has a sign similar to the sign of the glottal pulse of the corresponding frame of the encoded sound signal.

12. A method as defined in claim 1, wherein
the position of the maximum amplitude pulse in the erasure-concealed frame is a position of a maximum amplitude pulse closest to the position of said glottal pulse of said corresponding frame of said encoded sound signal.

13. A method as defined in claim 1, wherein aligning the position of the maximum amplitude pulse in the erasure-concealed frame with the position of the glottal pulse in the corresponding frame of the encoded sound signal comprises:
determining an offset between the position of the maximum amplitude pulse in the erasure-concealed frame and the position of the glottal pulse in the corresponding frame of the encoded sound signal; and
inserting/removing in the erasure-concealed frame a number of samples corresponding to the determined offset.

14. A method as defined in claim 13, wherein inserting/removing the number of samples comprises:
determining at least one region of minimum energy in the erasure-concealed frame; and
distributing the number of samples to be inserted/removed around the at least one region of minimum energy.

15. A method as defined in claim 14, wherein distributing the number of samples to be inserted/removed around the at least one region of minimum energy comprises distributing the number of samples around the at least one region of minimum energy using the following relation:

$$R(i) = \text{round}\left(\frac{(i+1)^2}{2} f - \sum_{k=0}^{i-1} R(k)\right)$$

for i=0, . . . , $N_{min}-1$ and k=0, . . . , i−1 and $N_{min}>1$
where $$f = \frac{2|T_e|}{N_{min}^2},$$

$N_{min}$ is the number of minimum energy regions, and $T_e$ is the offset between the position of the maximum amplitude pulse in the erasure-concealed frame and the position of the glottal pulse in the corresponding frame of the encoded sound signal.

16. A method as defined in claim 15, wherein R(i) is in increasing order, so that samples are mostly added/removed towards an end of the erasure-concealed frame.

17. A method as defined in claim 1, wherein conducting frame erasure concealment in response to the received concealment/recovery parameters comprises, for voiced erased frames:
constructing a periodic part of an excitation signal in the erasure-concealed frame in response to the received concealment/recovery parameters; and
constructing a random innovative part of the excitation signal by randomly generating a non-periodic, innovative signal.

18. A method as defined in claim 1, wherein conducting frame erasure concealment in response to the received concealment/recovery parameters comprises, for unvoiced erased frames, constructing a random innovative part of an excitation signal by randomly generating a non-periodic, innovative signal.

19. A method as defined in claim 1, wherein the concealment/recovery parameters further include signal classification.

20. A method as defined in claim 19, wherein the signal classification comprises classifying successive frames of the encoded sound signal as unvoiced, unvoiced transition, voiced transition, voiced, or onset.

21. A method as defined in claim 20, wherein the classification of a lost frame is estimated based on the classification of a future frame and a last received good frame.

22. A method as defined in claim 21, wherein the classification of the lost frame is set to voiced if the future frame is voiced and the last received good frame is onset.

23. A method as defined in claim 22, wherein the classification of the lost frame is set to unvoiced transition if the future frame is unvoiced and the last received good frame is voiced.

24. A method as defined in claim 1, wherein:
the sound signal is a speech signal;
determination, in the encoder, of concealment/recovery parameters includes determining the phase information and a signal classification of successive frames of the encoded sound signal;
conducting frame erasure concealment in response to the concealment/recovery parameters comprises, when an onset frame is lost which is indicated by the presence of a voiced frame following frame erasure and an unvoiced frame before frame erasure, artificially reconstructing the lost onset frame; and
resynchronizing the erasure-concealed, lost onset frame in response to the phase information with the corresponding onset frame of the encoded sound signal.

25. A method as defined in claim 24, wherein artificially reconstructing the lost onset frame comprises artificially reconstructing a last glottal pulse in the lost onset frame as a low-pass filtered pulse.

26. A method as defined in claim 24, further comprising scaling the reconstructed lost onset frame by a gain.

27. A method as defined in claim 1, comprising, when the phase information is not available at the time of concealing an erased frame, updating the content of an adaptive codebook of the decoder with the phase information when available before decoding a next received, non erased frame.

28. A method as defined in claim 27, wherein
updating the adaptive codebook comprises resynchronizing the glottal pulse in the adaptive codebook.

29. A method for concealing frame erasures caused by frames of an encoded sound signal erased during transmission from an encoder to a decoder and for recovery of the decoder after frame erasures, the method comprising, in the decoder:
estimating a phase information of each frame of the encoded sound signal that has been erased during transmission from the encoder to the decoder; and
conducting frame erasure concealment in response to the estimated phase information, wherein the frame erasure concealment comprises resynchronizing, in response to the estimated phase information, each erasure-concealed frame with a corresponding frame of the encoded sound signal,
wherein:
the estimated phase information is an estimated position of a glottal pulse of each frame of the encoded sound signal that has been erased; and resynchronizing an erasure-concealed frame with the corresponding frame of the encoded sound signal comprises determining a maximum amplitude pulse in the erasure-concealed frame, and aligning the maximum amplitude pulse in the erasure-concealed frame with the estimated position of the glottal pulse.

30. A method as defined in claim 29, wherein estimating the phase information comprises estimating a position of a last glottal pulse of each frame of the encoded sound signal that has been erased.

31. A method as defined in claim 30, wherein estimating the position of the last glottal pulse of each frame of the encoded sound signal that has been erased comprises:

estimating a glottal pulse from a past pitch value; and interpolating the estimated glottal pulse with the past pitch value so as to determine estimated pitch lags.

32. A method as defined in claim 31, wherein aligning the maximum amplitude pulse in the erasure-concealed frame with the estimated glottal pulse comprises:

calculating pitch cycles in the erasure-concealed frame;

determining an offset between the estimated pitch lags and the pitch cycles in the erasure-concealed frame; and inserting/removing a number of samples corresponding to the determined offset in the erasure-concealed frame.

33. A method as defined in claim 32, wherein inserting/removing the number of samples comprises:

determining at least one region of minimum energy in the erasure-concealed frame; and distributing the number of samples to be inserted/removed around the at least one region of minimum energy.

34. A method as defined in claim 33, wherein distributing the number of samples to be inserted/removed around the at least one region of minimum energy comprises distributing the number of samples around the at least one region of minimum energy using the following relation:

$$R(i) = \text{round}\left(\frac{(i+1)^2}{2}f - \sum_{k=0}^{i-1} R(k)\right)$$

for i=0, . . . , $N_{min}-1$ and k=0, . . . , i−1 and $N_{min}>1$ where $$f = \frac{2|T_e|}{N_{min}^2},$$

$N_{min}$ is the number of minimum energy regions, and $T_e$ is the offset between the estimated pitch lags and the pitch cycles in the erasure-concealed frame.

35. A method as defined in claim 34, wherein R(i) is in increasing order, so that samples are mostly added/removed towards the end of the erasure-concealed frame.

36. A method as defined in claim 29, comprising attenuating a gain of each erasure-concealed frame, in a linear manner, from the beginning to the end of the erasure-concealed frame.

37. A method as defined in claim 36, wherein the gain of each erasure-concealed frame is attenuated until α is reached, wherein α is a factor for controlling a converging speed of the decoder recovery after frame erasure.

38. A method as defined in claim 37, wherein the factor α is dependent on stability of a LP filter for unvoiced frames.

39. A method as defined in claim 38, wherein the factor α further takes into consideration an energy evolution of voiced segments.

40. A device for concealing frame erasures caused by frames of an encoded sound signal erased during transmission from an encoder to a decoder and for recovery of the decoder after frame erasures, the device comprising, in the decoder:

means for receiving concealment/recovery parameters including at least phase information related to frames of the encoded sound signal, wherein the phase information comprises a position of a glottal pulse in each frame of the encoded sound signal; and means for conducting frame erasure concealment in response to the received concealment/recovery parameters, wherein:

the means for conducting frame erasure concealment comprises means for resynchronizing, in response to the received phase information, the erasure-concealed frames with corresponding frames of the encoded sound signal; and the means of resynchronizing an erasure-concealed frame with a corresponding frame of the encoded sound signal comprises:

means for determining, in the erasure-concealed frame, a position of a maximum amplitude pulse; and means for aligning the position of the maximum amplitude pulse in the erasure-concealed frame with the position of the glottal pulse of the corresponding frame of the encoded sound signal.

41. A device for concealing frame erasures caused by frames of an encoded sound signal erased during transmission from an encoder to a decoder and for recovery of the decoder after frame erasures, the device comprising, in the decoder:

a receiver of concealment/recovery parameters including at least phase information related to frames of the encoded sound signal, wherein the phase information comprises a position of a glottal pulse in each frame of the encoded sound signal; and a frame erasure concealment module supplied with the received concealment/recovery parameters, wherein:

the frame erasure concealment module comprises a synchronizer of the erasure-concealed frames with corresponding frames of the encoded sound signal in response to the received phase information; and the synchronizer, for synchronizing an erasure-concealed frame with a corresponding frame of the encoded sound signal, determines in the erasure-concealed frame a position of a maximum amplitude pulse, and aligns the position of the maximum amplitude pulse in the erasure-concealed frame with the position of the glottal pulse of the corresponding frame of the encoded sound signal.

42. A device as defined in claim 41, comprising:

in the encoder, a generator of the concealment/recovery parameters; and a communication link for transmitting to the decoder concealment/recovery parameters determined in the encoder.

43. A device as defined in claim 41, wherein the phase information comprises a position and sign of a last glottal pulse in each frame of the encoded sound signal.

44. A device as defined in claim 42, further comprising a quantizer of the position of the glottal pulse prior to transmission of the position of the glottal pulse to the decoder, via the communication link.

45. A device as defined in claim 42, wherein the generator of the concealment/recovery parameters determines as the phase information a position and sign of a last glottal pulse in each frame of the encoded sound signal, the device further comprising a quantizer of the position and sign of the last glottal pulse prior to transmission of the position and sign of the last glottal pulse to the decoder, via the communication link.

46. A device as defined in claim 44, further comprising an encoder of the quantized position of the glottal pulse into a future frame of the encoded sound signal.

47. A device as defined in claim 42, wherein the generator determines as the position of the glottal pulse a position of a maximum amplitude pulse in each frame of the encoded sound signal.

48. A device as defined in claim 42, wherein the generator of the concealment/recovery parameters determines as the phase information a position and sign of a last glottal pulse in each frame of the encoded sound signal, and wherein the generator determines as the position and sign of the last glottal pulse a position and sign of a maximum amplitude pulse in each frame of the encoded sound signal.

49. A device as defined in claim 47, wherein the generator determines as phase information a sign of the glottal pulse as a sign of the maximum amplitude pulse in the frame of the encoded sound signal.

50. A device as defined in claim 41, wherein the synchronizer:

determines an offset between the position of the maximum amplitude pulse in each erasure-concealed frame and the position of the glottal pulse in the corresponding frame of the encoded sound signal; and inserts/removes a number of samples corresponding to the determined offset in each erasure-concealed frame so as to align the position of the maximum amplitude pulse in the erasure-concealed frame with the position of the glottal pulse in the corresponding frame of the encoded sound signal.

51. A device as defined in claim 43, wherein the synchronizer:

determines in each erasure-concealed frame, a position of a maximum amplitude pulse having a sign similar to the sign of the last glottal pulse, closest to the position of the last glottal pulse in the corresponding frame of the encoded sound signal;

determines an offset between the position of the maximum amplitude pulse in each erasure-concealed frame and the position of the last glottal pulse in the corresponding frame of the encoded sound signal; and inserts/removes a number of samples corresponding to the determined offset in each erasure-concealed frame so as to align the position of the maximum amplitude pulse in the erasure-concealed frame with the position of the last glottal pulse in the corresponding frame of the encoded sound signal.

52. A device as defined in claim 50, wherein the synchronizer further:

determines at least one region of minimum energy in each erasure-concealed frame by using a sliding window; and distributes the number of samples to be inserted/removed around the at least one region of minimum energy.

53. A device as defined in claim 52, wherein the synchronizer uses the following relation for distributing the number of samples to be inserted/removed around the at least one region of minimum energy:

$$R(i) = \text{round}\left(\frac{(i+1)^2}{2} f - \sum_{k=0}^{i-1} R(k)\right)$$

for i=0, . . . , $N_{min}-1$ and k=0, . . . , i−1 and $N_{min}>1$ where $$f = \frac{2|T_e|}{N_{min}^2},$$

$N_{min}$ is the number of minimum energy regions, and $T_e$ is the offset between the position of the maximum amplitude pulse in the erasure-concealed frame and the position of the glottal pulse in the corresponding frame of the encoded sound signal.

54. A device as defined in claim 53, wherein R(i) is in increasing order, so that samples are mostly added/removed towards an end of the erasure-concealed frame.

55. A device as defined in claim 41, wherein the frame erasure concealment module supplied with the received concealment/recovery parameters comprises, for voiced erased frames:

a generator of a periodic part of an excitation signal in each erasure-concealed frame in response to the received concealment/recovery parameters; and a random generator of a non-periodic, innovative part of the excitation signal.

56. A device as defined in claim 41, wherein the frame erasure concealment module supplied with the received concealment/recovery parameters comprises, for unvoiced erased frames, a random generator of a non-periodic, innovative part of an excitation signal.

57. A device as defined in claim 41, wherein the decoder updates, when the phase information is not available at the time of concealing an erased frame, the content of an adaptive codebook of the decoder with the phase information when available before decoding a next received, non erased frame.

58. A device as defined in claim 57, wherein the decoder, for updating the adaptive codebook, resynchronizes the glottal pulse in the adaptive codebook.

59. A device as defined in claim 41, wherein the synchronizer determines, in each erasure-concealed frame, a position of a maximum amplitude pulse having a sign similar to the sign of the glottal pulse, closest to the position of said glottal pulse in the corresponding frame of the encoded sound signal.

60. A device as defined in claim 41, wherein the position of the maximum amplitude pulse in the erasure-concealed frame is a position of a maximum amplitude pulse closest to the position of the glottal pulse of the corresponding frame of the encoded sound signal.

61. A device for concealing frame erasures caused by frames of an encoded sound signal erased during transmission from an encoder to a decoder and for recovery of the decoder after frame erasures, the device comprising:

means for estimating, at the decoder, a phase information of each frame of the encoded sound signal that has been erased during transmission from the encoder to the decoder; and means for conducting frame erasure concealment in response to the estimated phase information, the means for conducting frame erasure concealment comprising means for resynchronizing each erasure-concealed frame with a corresponding frame of the encoded sound signal;

wherein:

the estimated phase information is an estimated position of a glottal pulse of each frame of the encoded sound signal that has been erased; and the means for resynchronizing each erasure-concealed frame with the corresponding frame of the encoded sound signal comprises means for determining a maximum amplitude pulse in the erasure-concealed frame, and aligning the maximum amplitude pulse in the erasure-concealed frame with the estimated position of the glottal pulse.

62. A device for concealing frame erasures caused by frames of an encoded sound signal erased during transmission from an encoder to a decoder and for recovery of the decoder after frame erasures, the device comprising:

at the decoder, an estimator of a phase information of each frame of the encoded signal that has been erased during transmission from the encoder to the decoder; and an erasure concealment module supplied with the estimated phase information and comprising a synchronizer which, in response to the estimated phase information, resynchronizes each erasure-concealed frame with a corresponding frame of the encoded sound signal;

wherein:

the estimated phase information is an estimated position of a glottal pulse of each frame of the encoded sound signal that has been erased; and the synchronizer determines a maximum amplitude pulse in the erasure-concealed frame, and aligns the maximum amplitude pulse in the erasure-concealed frame with the estimated position of the glottal pulse.

63. A device as defined in claim 62, wherein the estimator of the phase information estimates, from a past pitch value, a position and sign of a last glottal pulse in each frame of the encoded sound signal, and interpolates the estimated glottal pulse with the past pitch value so as to determine estimated pitch lags.

64. A device as defined in claim 63, wherein the synchronizer:

determines a maximum amplitude pulse and pitch cycles in each erasure-concealed frame;

determines an offset between the pitch cycles in each erasure-concealed frame and the estimated pitch lags in the corresponding frame of the encoded sound signal; and inserts/removes a number of samples corresponding to the determined offset in each erasure-concealed frame so as to align the maximum amplitude pulse in the erasure-concealed frame with the estimated last glottal pulse.

65. A device as defined in claim 64, wherein the synchronizer further:

determines at least one region of minimum energy by using a sliding window; and distributes the number of samples around the at least one region of minimum energy.

66. A device as defined in claim 65, wherein the synchronizer uses the following relation for distributing the number of samples around the at least one region of minimum energy:

$$R(i) = \text{round}\left(\frac{(i+1)^2}{2}f - \sum_{k=0}^{i-1} R(k)\right)$$

for i=0, . . . , $N_{min}-1$ and k=0, . . . , i−1 and $N_{min}>1$ where $$f = \frac{2|T_e|}{N_{min}^2},$$

$N_{min}$ is the number of minimum energy regions, and $T_e$ is the offset between the pitch cycles in each erasure-concealed frame and the estimated pitch lags in the corresponding frame of the encoded sound signal.

67. A device as defined in claim 66, wherein R(i) is in increasing order, so that samples are mostly added/removed towards an end of the erasure-concealed frame.

68. A device as defined in claim 63, further comprising an attenuator for attenuating a gain of each erasure-concealed frame, in a linear manner, from a beginning to an end of the erasure-concealed frame.

69. A device as defined in claim 68, wherein the attenuator attenuates the gain of each erasure-concealed frame until α, wherein α is a factor for controlling a converging speed of the decoder recovery after frame erasure.

70. A device as defined in claim 69, wherein the factor α is dependent on stability of a LP filter for unvoiced frames.

71. A device as defined in claim 70, wherein the factor α further takes into consideration an energy evolution of voiced segments.

72. A device as defined in claim 62, wherein the estimator estimates a position of a last glottal pulse of each frame of the encoded sound signal that has been erased.

* * * * *